(12) United States Patent
Atallah et al.

(10) Patent No.: US 6,941,463 B1
(45) Date of Patent: Sep. 6, 2005

(54) SECURE COMPUTATIONAL OUTSOURCING TECHNIQUES

(75) Inventors: Mikhail J. Atallah, West Lafayette, IN (US); John R. Rice, West Lafayette, IN (US); Eugene H. Spafford, West Lafayette, IN (US); Kostas N. Pantazopoulos, New York, NY (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 09/312,230

(22) Filed: May 14, 1999

Related U.S. Application Data
(60) Provisional application No. 60/085,515, filed on May 14, 1998.

(51) Int. Cl.[7] .............................. H04L 9/00; G06F 15/16
(52) U.S. Cl. ....................................... 713/190; 709/201
(58) Field of Search ................................ 713/190, 189, 713/150; 709/201, 1; 700/1

(56) References Cited

U.S. PATENT DOCUMENTS

| | | |
|---|---|---|
| 5,687,191 A | 11/1997 | Lee et al. |
| 5,745,573 A | 4/1998 | Lipner et al. |
| 5,822,360 A | 10/1998 | Lee et al. |
| 5,892,900 A | 4/1999 | Ginter et al. |
| 5,933,498 A | 8/1999 | Schneck et al. |
| 6,044,469 A | 3/2000 | Horstmann |
| 6,061,449 A | 5/2000 | Candelore et al. |
| 6,119,108 A | 9/2000 | Holmes et al. |
| 6,138,119 A | 10/2000 | Hall et al. |
| 6,175,925 B1 | 1/2001 | Nardone et al. |
| 6,178,509 B1 | 1/2001 | Nardone et al. |
| 6,185,683 B1 | 2/2001 | Gintner et al. |
| 6,192,475 B1 | 2/2001 | Wallace |
| 6,205,550 B1 | 3/2001 | Nardone et al. |
| 6,237,786 B1 | 5/2001 | Gintner et al. |

OTHER PUBLICATIONS

Abadi et al, "On Higding Information from an Oracle", 1989, Journal of Computer and System Sciences, 39, pp. 1–29.*

Abadi et al, "Secure Circuit Evaluation", 1990, Journal of Cryptology, 3, pp. 1–12.*

Matsumoto et al, "Speeding Up Secret Computations with Insecure Auxilary Devices", 1990, Springer–Verlag, pp. 497–506.*

Kawamura et al, "Fast Server–Aided Secret Computation Protocols for Modular Exponentiation", 1993, IEEE, pp. 778–784.*

Casanova et al, "Netsolve: A Network Server for Solving Computational Science Problems", 1996, Univ. Tennesse, pp. 1–14.*

Atallah, Mikhail J., Rice, John R.; Secure Outsourcing of Scientific Computations; Dec. 7, 1998.

Atallah, Mikhail J., Pantazopoulos, Konstantinos N., Spafford, Eugene H.; Secure Outsourcing of Some Computations; date of publication unknown.

* cited by examiner

*Primary Examiner*—Matthew Smithers
(74) *Attorney, Agent, or Firm*—Ice Miller

(57) ABSTRACT

A technique includes the determination of a set of arguments for an outsourced computation and preparing a group of disguised arguments corresponding to the set of arguments with a first computer. The first computer outputs the disguised arguments to a second computer. The second computer performs the outsourced computation with the disguised arguments to determine a corresponding disguised result. The second computer returns the disguised result to the first computer. The first computer recovers an actual answer from the disguised result. Before outsourcing, the first computer can classify the outsourced computation into one of a number of computation types and select one or more of a number of disguising operations based this classification.

74 Claims, 4 Drawing Sheets

SECURE COMPUTATIONAL OUTSOURCING TECHNIQUES

CROSS-REFERENCE TO RELATED APPLICATIONS

The present application claims the benefit of commonly owned U.S. Provisional Patent Application Ser. No. 60/085,515, filed 14 May 1998 which is hereby incorporated by reference in its entirety.

BACKGROUND OF THE INVENTION

The present invention relates to computer security techniques, and more particularly, but not exclusively, relates to techniques to provide more secure outsourcing of computations.

Rapid growth in the area of computer technology, including networking schemes like the internet, has facilitated the transmission of data from a processing system at one site (the customer) to another site (the agent) to perform certain computations. Such "outsourcing" of certain computations may be desired, for example, when the customer lacks the hardware resources, software resources, or other know-how to cost-effectively perform the computations.

In one example, outsourcing is utilized in the financial services industry, where, for instance, the customer data includes projections of the likely future evolution of certain commodity prices, interest and inflation rates, economic statistics, portfolio holdings, etc. In another example, outsourcing is utilized in the energy services industry, where the proprietary data is typically seismic, and can be used to estimate the likelihood of finding oil or gas at a particular geographic spot in question. The seismic data may be so massive that the performance of corresponding matrix multiplication and inversion computations would be beyond the resources of most major oil companies. Many other industries can also benefit from outsourcing.

With the advent of computational outsourcing, concerns regarding the agent's misappropriation of customer data or the computational results have arisen. These concerns arise not only with the customer, but also with an agent who wants to reduce the risk of misappropriation by its employees. One proposed scheme is to utilize standard cryptographic techniques to encrypt the data sent by the customer to the agent. While encryption may enhance security with respect to an attacking third party, it still requires that the agent have access to at least some of the cryptographic information, such as encryption/decryption keys, to perform a meaningful calculation. As a result, this scheme still provides the agent ready access to the actual data. Moreover, such schemes assume the agent will be a permanent repository of the data, performing certain operations on it and maintaining certain predicates. In many instances, this situation is also undesirable. Thus, there is a demand for techniques to improve the security of outsourced computations.

SUMMARY OF THE INVENTIONS

One form of the present invention is a unique computational technique.

A further form of the present invention is a unique system or method of disguising arguments to be submitted to a computation.

Another form of the present invention is a unique system or method to perform a computation on disguised arguments and return a disguised result.

Yet another form of the present invention is a computer readable medium that uniquely defines computer programming instructions to hide a group of actual arguments for a computation to be outsourced.

Still another form of the present invention is a computer data transmission medium that includes a number of uniquely disguised arguments. These disguised arguments are sent via the medium to a site that performs an outsourced computation with the disguised arguments.

The above-described forms of the present invention may be practiced in the alternative or in combination. Further, the above-described forms are merely illustrative and should not be considered restrictive or limiting, it being understood that other forms, features, aspects, objects, and embodiments of the present invention shall become apparent from the drawings and description contained herein.

DESCRIPTION OF THE PREFERRED EMBODIMENTS

Figure 1:
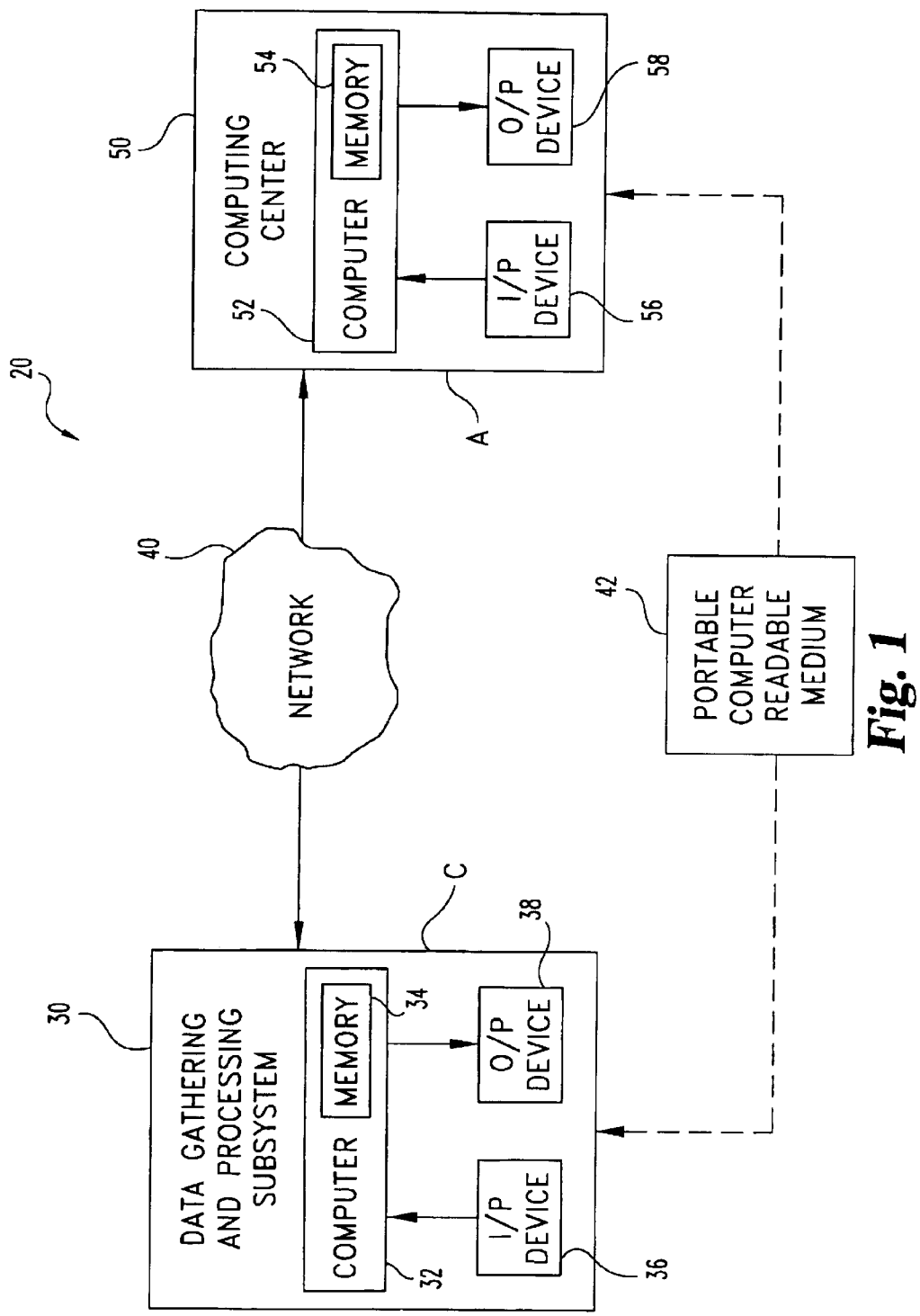
FIG. 1 is a diagrammatic view of one system according to the present invention.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

FIG. 1 illustrates system 20. System 20 includes data gathering and processing subsystem 30 and computing center 50. Subsystem 30 is alternatively depicted as customer C, and computing center 50 is alternatively depicted as agent A. Subsystem 30 includes at least one computer 32. Computer 32 has memory 34, at least one input (I/P) device 36, and at least one output (O/P) device 38. Computing center 50 includes at least one computer 52 with memory 54, at least one input (I/P) device 56, and at least one output (O/P) device 58. Memories 34, 54 each define at least one computer readable medium that is accessed by computers 32, 52, respectively.

In one example, computers 32, 52 are of the programmable, digital variety and, memories 34, 54 are comprised of one or more components of the solid-state electronic type, electromagnetic type like a hard disk drive, optical type like a Compact Disk Read Only Memory (CD ROM), or a combination of these. In other embodiments, computer 32 or computer 52 and/or memory 34 or memory 54 may be otherwise configured as would occur to those skilled in the art. Typically, computers 32, 52 will differ in some regard with respect to one another as more fully explained hereinafter, however, other embodiments of the present invention may include computers 32, 52 that are substantially the same.

Input devices 36, 56 may include standard operator input devices such as a keyboard, mouse, digitizing pen, dedicated equipment for automatically inputting data, or such other devices as would occur to those skilled in the art. Output devices 38, 58 may include one or more displays, printers, or such other types as would occur to those skilled in the art. Further, input devices 36, 56 or output devices 38, 58 may be in the form of components that perform both input and output operations such as one or more modems or other communication links. Such components may alternatively be considered a computer transmission medium to sending and receiving data.

FIG. 1 depicts network 40 communicatively coupling subsystem 30 and computing center 50. Network 40 may be an internet connection or other form of network as would occur to those skilled in the art. Further, portable memory medium 42 is shown as another means of exchanging data between subsystem 30 and computing center 50. Portable memory medium 42 may be in the form of one or more electromagnetic disks, tapes, or cartridges, optical disks, or such other form as would occur to those skilled in the art. It should be appreciated that network 40 and medium 42 may each be considered as being one of input devices 34, 54 and/or one of output devices 38, 58; and alternatively may each be regarded a type of data transmission medium for the transmission of computer data.

Figure 2:
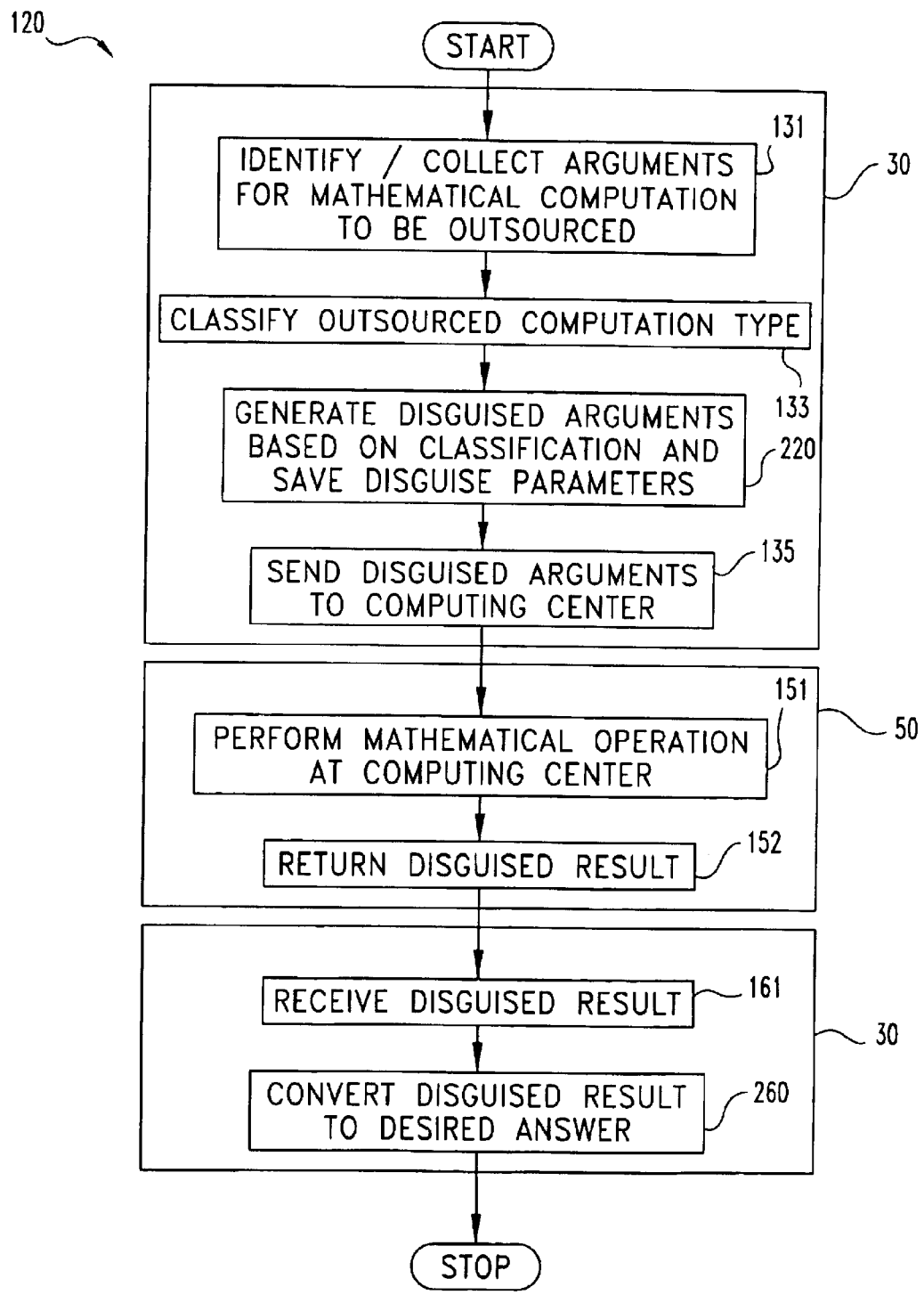
FIG. 2 is a flow chart of one process performed according to the present invention with the system of FIG. 1.

Referring also to FIG. 2, outsourcing process 120 is illustrated. In stage 131 of process 120, subsystem 30 identifies and collects a group of actual arguments AA for a computation to be outsourced. As used herein, "argument" refers broadly to any symbol, value, function, description, code, or other mathematical object that is input to a computation.

Typically, subsystem 30 is not as desirable as computing center 50 for performance of the computation designated for outsourcing. This distinction may arise from one or more differences relating to hardware, software, operator expertise, or available processing time. However, in other embodiments, the decision to outsource a particular computation may be independent of any such differences.

Once arguments are determined in stage 131, the outsourced mathematical computation is classified into one of a number of types in stage 133. A nonexclusive listing of computation types that may be good candidates for outsourcing is provided in table I as follows:

TABLE I

| No. | Type |
|---|---|
| 1. | Matrix Multiplication |
| 2. | Matrix Inversion |
| 3. | Solution of a Linear System of Equations |
| 4. | Quadrature |
| 5. | Convolution |
| 6. | Numerical Solution of Differential Equations |
| 7. | Optimization |
| 8. | Solution of a Nonlinear System |
| 9. | Image Edge Detection |
| 10. | Image Template Matching |
| 11. | Sorting |
| 12. | Character String Pattern Matching |

It should be appreciated that the list of Table I is merely illustrative, and that other types of outsourced computations and classifications may be utilized in other embodiments.

After classification, process 120 resumes with operation 220 to determine a set of disguised arguments DA based on the outsourced computation classification and the actual arguments AA. Disguised arguments DA are created in operation 220 to hide the nature of actual arguments AA from the agent A selected to perform the outsourced computation, but at the same time permit recovery of a meaningful actual answer SA by customer C from data provided by the computation. Several nonexclusive examples of the preparation of disguised arguments DA and recovery of actual answer SA are provided hereinafter in connection with the description of FIGS. 3 and 4.

Once disguised arguments DA are prepared, subsystem 30 (customer C) sends disguised arguments DA to computing center 50 (agent A) to perform the outsourced computation in stage 135. The transmission in stage 135 may also include instructions regarding the type of outsourced computation. Alternatively, the nature of the computation may be established either before or after disguised arguments DA are sent. Disguised arguments DA and any instructions concerning the outsourced computation to be performed may be transmitted to computing center 50 via network 40, through portable computer readable medium 42, a combination of these, or through such other means as would occur to those skilled in the art.

In stage 151, computing center 50 performs the designated computation with disguised arguments DA. For example, computer 52 may execute programming instructions stored in memory 54 to perform this computation. In one example, computer 52 of computing center 50 is programmed to perform several different types of computations including one or more of those listed in Table I. Because disguised arguments DA are used, the result of the outsourced computation performed by computing center 50 typically differs from the actual answer SA that would have resulted if the outsourced computation had been performed with the actual arguments AA. The result for the computation performed with disguised arguments DA is then, in turn, hidden or disguised and is designated as disguised result DR. Computing center 50 sends disguised result DR back to subsystem 30 in stage 152. Subsystem 30 receives disguised result DR in stage 161 and recovers the desired actual answer SA in operation 260. The recovery of actual answer SA is described in greater detail in connection with FIGS. 3 and 4 and the examples that follow.

It should be appreciated that disguised arguments DA and disguised result DR are the only information provided to computing center 50, such that the true nature of the data and answer for the selected outsourced computation are hidden through process 120. Consequently, a measure of security is provided by outsourcing process 120 relative to simply trusting agent A with the actual arguments AA and/or actual answer SA. Further, the degree of security may be varied in accordance with the particular nature of the outsourced computation and various parameters associated with operations 220 and 260 of process 120.

Figure 3:
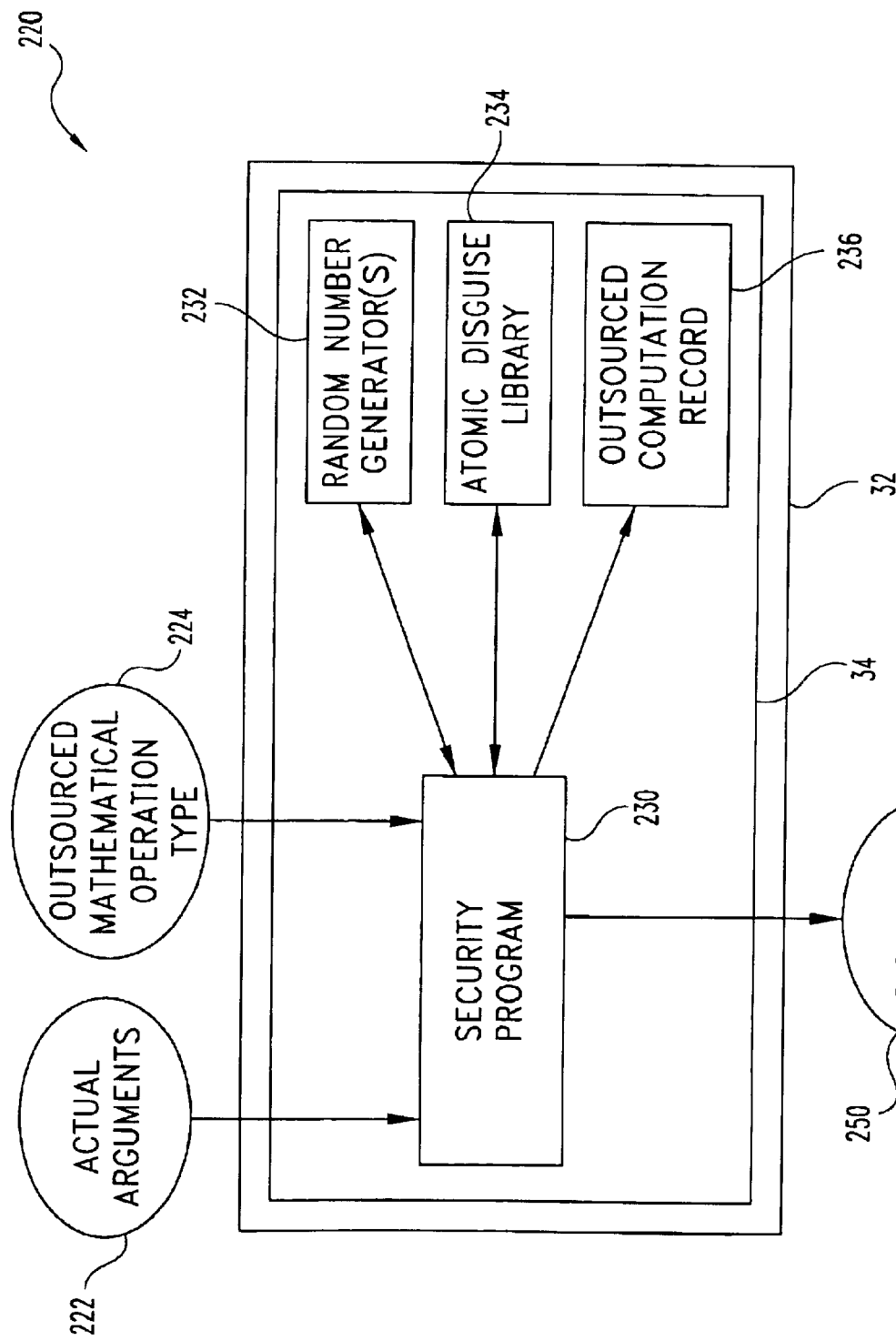
FIG. 3 is a block diagram of selected operational elements for disguising arguments according to the process of FIG. 2.
Figure 4:
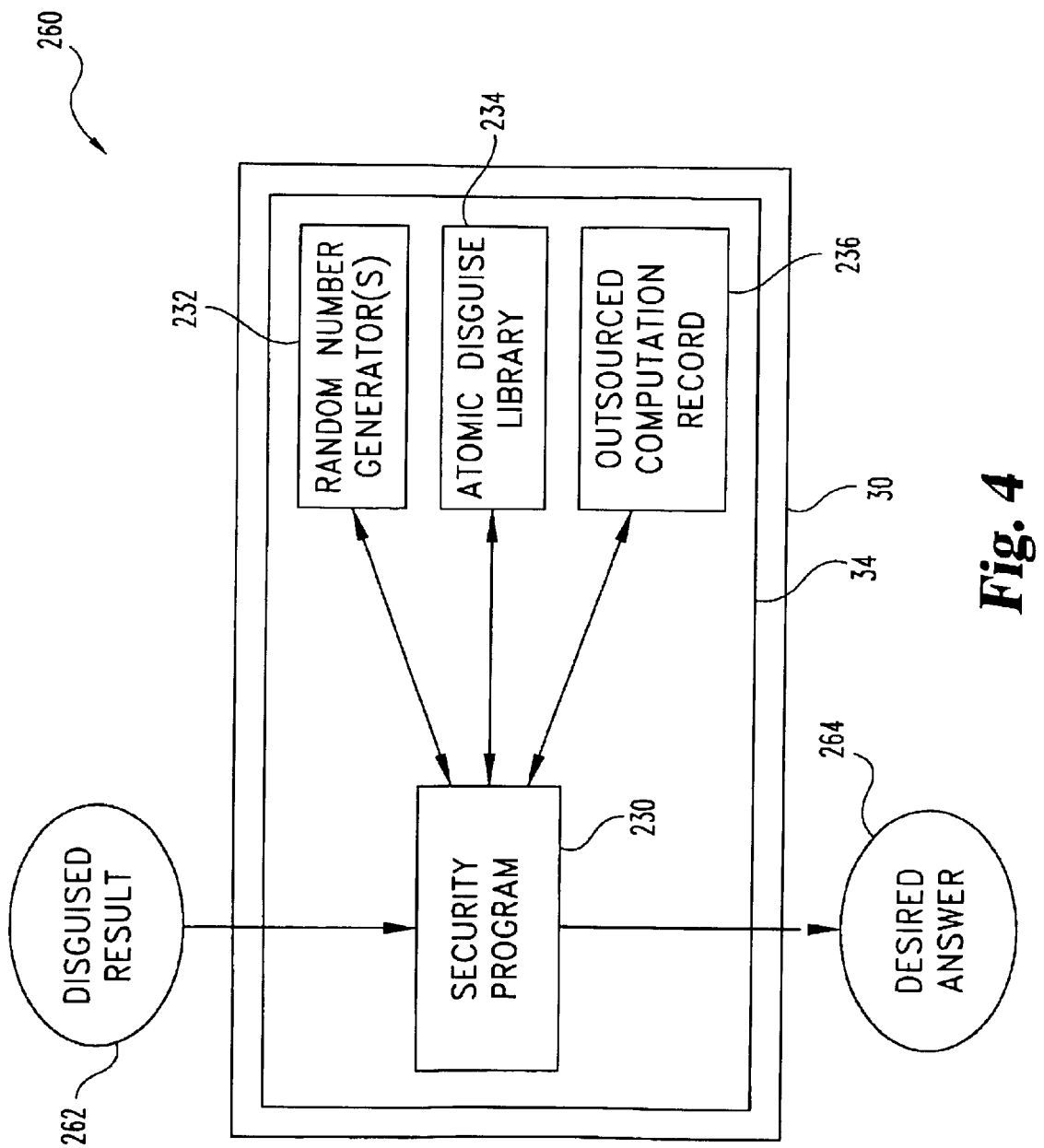
FIG. 4 is a block diagram of selected operational elements for recovering an actual answer from a disguised result according to the process of FIG. 2.

Referring additionally to the block diagrams of FIGS. 3 and 4, the preparation of disguised arguments DA and the recovery of actual answer SA are further described as performed by operations 220 and 260, respectively. FIGS. 3 and 4 both include a block representative of outsourcing security program 230. Program 230 resides in memory 34 and is configured to be executed by computer 32. In FIG. 3, program 230 receives actual arguments AA as input 222. Program 230 also receives input 224. Input 224 indicates the type of outsourced computation as determined through the classification performed in stage 133.

Program 230 has access to one or more pseudorandom number generators 232 residing in the form of one or more executable subroutines in memory 34. Also, memory 34 includes disguise library 234. Library 234 includes a number of different forms of argument disguise operations one or more of which are used to form a given set of disguised arguments DA. Various classes of the disguised operations are listed in table II that follows:

TABLE II

| No. | Class |
|-----|-------|
| 1.  | Random Objects |
| 2.  | Linear Operator Modification |
| 3.  | Object Modification |
| 4.  | Domain and/or Dimension Modification |
| 5.  | Coordinate System Modification |
| 6.  | Identities and Partitions of Unity |

The listing of Table II is meant to be merely representative, it being understood that other forms and classes of disguises may alternatively or additionally be included as would occur to those skilled in the art.

The first class of disguises are random objects: numbers, vectors, matrices, permutations, or functions, to name a few. These objects are "mixed into" the computation in some way to disguise it, and are at least in part created from random numbers. If the numbers are truly random, then they should be saved in record 236 for use in the disguise and recovery of actual answer SA. If the random numbers come from a pseudorandom number generator, such as generators 232, then it is sufficient to save the seed and parameters of the generator in record 236.

Under some circumstances, it may be desirable to hide as much information as possible about the characteristics of the random number generation technique utilized. It should be appreciated that once the distribution characteristics are known, it may become easier to detect true data being obscured by the random numbers. For example, if random numbers generated uniformly in some interval centered at zero where each added to a different entry of a large vector to be hidden, the random values would not do a good job of "hiding" the true values of the vector entries because the sum of the modified vector entries would be very close to the sum of the true value entries of the vector given the relationship of the random values to zero.

In one embodiment, rather than using a pseudorandom number generator with the same probability distribution for every random number utilized, the exact form of distribution used may be varied from one random value to the next. Thus, random number generators 232 may each have a different distribution to better hide their corresponding probabilistic characteristics. For this approach, random number generators 232 may further be arranged to provide a one-time random sequences. To illustrate, let four random number generators 232 be designated as: G1=a uniform generator with upper range and lower range parameters; G2=normal generator with mean and standard deviation parameters; G3=exponential generator with mean and exponent parameters; and G4=gamma generator with mean and shape parameters. Thus, for this illustration each generator G1–G4 has a different pair of distribution parameters. Twelve random numbers are selected: the first 8 are the parameter pairs of the four generators G1–G4 and the other four, are the $\alpha_1$, $\alpha_2$, $\alpha_3$, $\alpha_4$ coefficients used to create the one time random sequence, as indicated by expression (1) that follows:

$$\alpha_1 G1 + \alpha_2 G2 + \alpha_3 G3 + \alpha_4 G4 \qquad (1)$$

Note that in creating this one set of random numbers, a total of 16 numbers are used, the 8 generator parameters, the 4 coefficients $\alpha_1$–$\alpha_4$, and 4 seeds for generators G1–G4, respectively. In other embodiments, a different number and configuration of random number generators may be utilized to provide a desired set of random numbers. In one alternative embodiment, the desired level of security for a given problem not require more than one random number generator to provide desired random objects. For still another embodiment, random numbers may not be used at all, instead utilizing other disguise operations according to the present invention. For this embodiment, generators 232 may be absent.

One way security techniques based on random numbers might be defeated includes a type "statistical attack" that attempts to derive information about a given random number generator through matching the numbers to those produced by known random number generation techniques. Typically, the amount of processing needed to derive such information for robust random number generators is cost prohibitive. However, this type of attack may still be of concern in alternative embodiments where a higher level of security is desired—especially with the rapid advancement of computer processing technology.

Correspondingly, in addition to the one-time random sequence generation techniques previously described in connection with expression (1), the resistance of random number generators to a statistical attack in such alternative embodiments may be addressed by: (a) using random number generators 232 with real valued parameters having at least a 32 bit length whenever possible; (b) restarting random number generators 232 from time-to-time with new input values; and/or (c) changing the type of random number generators 232 used from time-to-time.

Another type of statistical attack is to attempt to determine the parameters of the probability distribution used to generate a group of random numbers. For this type, one can estimate the moments of the probability distribution by computing the moments of a collected sample of generated random numbers. The mean of the sample of size N converges to the mean of the distribution with an error that generally behaves according to $O(1/\sqrt{N})$; where the function $O(1/\sqrt{N})$ corresponds to processing time on the order of $1/\sqrt{N}$. While this rate of convergence is slow, a large sample of 10,000,000 may be utilized to provide estimates of moments with accuracy of about 0.03%. An alternative embodiment may be arranged to address this parameter-based statistical attack by: (a) using random number generators 232 with complex probability distribution functions to increase the number of different moments that need the attacker needs to defeat the security; (b) restarting the random number generator from time-to-time with new input values such that the sequence size generated with a given value is restricted; and (c) increase the number of parameters utilized to characterize the random number generator probability distribution function.

Once random numbers have been provided using one or more of these embodiments, then random vectors, matrices, and arrays may be generated using standard techniques. Random objects with integer (or discrete) values, such as permutations, also can be created from random numbers using standard techniques.

Random objects may further include determining one or more random functions in accordance with a set of random numbers. One embodiment of a random function determination routine that may be provided in program 230 begins with the selection of the dimension or basis of a corresponding function space F. Typically the basis should be relatively high to promote a greater degree of security. For example, a basis of 10 or 30 functions for a high dimensional space F of functions may be selected. Next, a random point in F is determined with one or more generators 232 to obtain a random function. The selection of the basis and other parameters, such as the domain and range of the desired random functions should be selected to be compatible with the computation to be disguised and generally should have high linear independence when a stable inversion of disguised results DR is desired.

To provide space F as a one-time random space, the following process may be included in the routine:

(a) Define the domain of the computation to correspond to a box (interval, rectangle, box, or other corresponding construct depending on the selected dimension).

(b) Select a random rectangular grid in the box with 10 lines in each dimension and assure a minimum separation.

(c) Generate K sets of random function values at all the grid points (including the boundaries), one set for each basis function desired (these values are selected to be in a desired range).

(d) Interpolate these values by cubic splines to create K basis functions. The cubic splines may be formed in accordance with C. deBoor, *A practical Guide to Splines*, SIAM Publications, (1978) which is hereby incorporated by reference in its entirety. It should be appreciated that cubic splines are smooth and have two continuous derivatives.

(e) Add to this set of K basis functions a basis for the quadratic polynomials.

This approach can be modified to make many kinds of one-time random spaces of functions. If functions with local support are needed, the cubic splines may be replaced with Hermite quintics as described in deBoor. If it is desirable for the functions to vary more in one part of the domain than another, then the grid may be refined in the corresponding part. If it is desirable for the functions to be more or less smooth, then the degree of smoothness of the cubic splines may be adjusted as appropriate. In still other embodiments, other techniques of random function generation may be utilized as would occur to those skilled in the art.

One way an attacker might try to defeat disguises based on random functions is through an "approximation theoretic attack." This type of attack can based on observations about the approximating power of the disguised functions. In one example, let $u(x)$ be an original function, and $f(x)$ be a disguise function in function space F such that $g(x)=u(x)+f(x)$ is observable by agent A. Agent A may evaluate $g(x)$ arbitrarily and, in particular, agent A might (if F were known) determine the best approximation $g^*(x)$ to $g(x)$ from F. Then the difference $g^*(x)-g(x)$ equals $u^*(x)-u(x)$ where $u^*(x)$ is the best approximation to $u(x)$ from F. Thus $g^*(x)-g(x)$ is entirely due to $u(x)$ and gives some information about $u(x)$.

An alternative embodiment arranged to address an approximation theoretic attack includes choosing F to have very good approximating power so that the size of $g^*(x)-g(x)$ is small. For example, if $u(x)$ is an "ordinary" function, then including in F the cubic polynomials and the cubic splines with 5 or 10 breakpoints (in each variable) generally improves approximation power. If $u(x)$ is not "ordinary" (e.g., is highly oscillatory, has boundary layers, has jumps or peaks) then including functions in F with similar features reduces the ability of agent A to discover information about $u(x)$ from $g(x)$. Another aspect that makes this kind of attack more difficult is to establish F as a one-time random space as previously described. For this aspect, because F itself is then unknown, the approximation $g^*(x)$ cannot be computed accurately and any estimates are correspondingly less uncertain. Still a further aspect is to approximate the function object $u(x)$ with high accuracy, such as a variable breakpoint piecewise polynomial, and adding one or more disguise functions with the same breakpoints and different values. Yet, in other embodiments, it may not be desired to take additional measures to address a statistical attack, an approximation theoretic attack, or both.

The second class of disguise operations include linear operator modification; where the operator equation is of the form $Lu=b$. For example, the linear and differential equations of the following expressions (2) and (3), respectively, are of this form:

$$\text{linear equations: } Ax=b \quad (2)$$

$$\text{differential equations: } y''+\cos(x)y'+x^2y=1-xe^{-x} \quad (3)$$

This second class of disguises exploits linearity by randomly choosing v like u, i.e., v is the same, type of mathematical object, and then solving $L(u+v)=b+Lv$; where $Lv$ is evaluated to be the same mathematical object type as b. In one embodiment, v is selected to be a combination of a random function and functions that already appear in the equation. For example, one could choose $v(x)$ in the above differential equation (3) to be $v_{Ran}(x)+4.2\cos(x)-2.034xe^{-x}$; where $v_{Ran}(x)$ is the random function component. In still other embodiments, different substitutions may be made as would occur to those skilled in the art.

A third class of disguise operations modify various mathematical objects of the computation to be outsourced. Such modifications may include addition or multiplication to disguise the computation. One example of an objection modification disguise is to add a random function to an integral as exemplified by expression (4) that follows:

$$\int_0^1 \sqrt{x}\cos(x+3) \quad (4)$$

In another example of object modification, the solution of the $Ax=b$ may be disguised by multiplying with 2 random diagonal matrices, $D_1$ and $D_2$, to provide $B=D_1AD_2$ with subsystem 30; where A is an n×n matrix and b is a corresponding vector of n. The resulting matrix B is then provided as part of the outsourced computation of expression (5) as follows:

$$By=D_1b \quad (5)$$

The solution x is then obtained from $x=D_2y$.

In a fourth class of disguises, the domain or dimensions, are modified. Modification techniques may include expansion, restriction, splitting or rearrangement. In an example of expansion, the evaluation of the integral of expression (6) that follows:

$$\int_0^1 \sqrt{x}\cos(x+3) \quad (6)$$

or solution of the problem of related type on [3,5] as shown in expression (7) that follows:

$$y'(x)=(x+y)e^{-xy}, y(3)=1 \quad (7)$$

can be modified by expanding [0,1] to [0,2] and [3,5] to [2,5], respectively. In the case of expression (6), a random function $u(x)$ is selected from function space F with $u(1)=\cos(4)$; it is integrated on [1,2]; and $\sqrt{x}\cos(x+3)$ is extended to [0,2] using u(x). In the second case of expression (7), a random function u(x) is selected from function space F with u(3)=1 and u'(3)=4e$^{-3}$. Its derivative u'(x) and its value u(2) are computed, and the following expressions (8) is solved with initial condition y'(2)=u'(2):

$$y'(x) = (x+y)e^{-xy} \quad \text{on } [3, 5] \qquad (8)$$
$$= u'(x) \qquad \text{on } [2, 3]$$

In an example of restriction, the dimension of a linear algebra computation is decreased by performing a part of it with subsystem 30, and outsourcing the rest. for example, in solving Ax=b, (where A is an n×n matrix and b a corresponding vector of dimension n), one of the unknowns is selected and eliminated by Gauss elimination at random by customer C (subsystem 30); and the remaining computation is then sent to the agent A (computing center 50). Correspondingly, the order of the matrix changes by 1 and, further, it modifies all the remaining elements of A and b.

In an example of splitting, a problem is partitioned into equivalent subproblems by splitting the domain. In the case of quadrature, this technique may be readily applied. The linear algebra problem Ax=b, (where A is an n×n matrix and b a corresponding vector of dimension n), can split by partitioning in accordance with the following expression (9):

$$A = \begin{pmatrix} A_{21} & A_{12} \\ A_{21} & A_{22} \end{pmatrix} \qquad (9)$$

and creating two linear equations as shown in following expressions (10) and (11):

$$A_{11}x_1 = b_1 - A_{12}x_2 \qquad (10)$$
$$(A_{22} - A_{21}A_{11}^{-1}A_{12})x_2 = b_2 - A_{21}A_{11}^{-1}b_1 \qquad (11)$$

In another example, the differential equation problem of the following expressions (12):

$$y'(x) = (x+y)e^{-xy} \text{ and } y'(3)=1 \text{ on } [3,5] \qquad (12)$$

can be split into the expressions (13) and (14) that follow:

$$y'(x) = (x+y)e^{-xy} y'(3)=1, \text{ on } [3,4] \qquad (13)$$
$$y'(x) = (x+y)e^{-xy} y'(u)=\text{as computed, on } [4,5] \qquad (14)$$

Accordingly, splitting may be utilized to disguise different computation parts in different ways.

A fifth class of disguise operations include utilizing one or more coordinate system changes. A related disguise for discrete problems, such as a linear algebra computations, are permutations of the corresponding matrix/vector indices. Coordinate system changes have been found to be particularly effective for enhancing security of outsourced computations concerning optimization and solutions to nonlinear systems. For example, consider the two-dimensional partial differential equation (PDE) problem of the following expression (15):

$$\nabla^2 f(x,y) + (6.2 + 12\sin(x+y))f = g_1(x,y) \quad (x,y) \text{ in } R \qquad (15)$$
$$f(x,y) = b_1(x,y) \qquad (x,y) \text{ in } R_1$$
$$f(x,y) = b_2(x,y) \qquad (x,y) \text{ in } R_2$$

-continued $$\frac{\partial f(x,y)}{\partial z} + g_2(x,y)f(x,y) = b_3(x,y) \qquad (x,y) \text{ in } R_3$$

where $R_1$, $R_2$, and $R_3$ comprise the boundary of R. To implement the change of coordinates, u=u(x,y), v=v(x,y), one must be able to: invert the change, that is find the functions x=x(u,v), y=y(u,v) and compute derivatives needed in the PDE as given in the following expression (16):

$$\frac{\partial^2 f}{\partial x^2} = \frac{\partial^2 f}{\partial u^2}\left(\frac{\partial^2 u}{\partial x^2}\right)^2 + \frac{\partial f}{\partial u}\frac{\partial^2 u}{\partial x^2} + \frac{\partial^2 f}{\partial v^2}\left(\frac{\partial v}{\partial x}\right)^2 + \frac{\partial f}{\partial v}\frac{\partial^2 u}{\partial x^2} \qquad (16)$$

The change of coordinates produces an equivalent PDE problem on some domain D in (u,v) space of the form given by the following expression (17):

$$\sum_{i,j=0}^{2} a_{ij}(u,v)\frac{\partial^i \partial^j}{\partial u^i, \partial u^j}f(u,v) = h_1(u,v) \quad (u,v) \in S \qquad (17)$$
$$f(u,v) = c_1(u,v) \qquad (u,v) \in S_1$$
$$f(u,v) = c_2(u,v) \qquad (u,v) \in S_2$$
$$d_1(u,v)\frac{\partial f(u,v)}{\partial u} + d_2(u,v)\frac{\partial f(u,v)}{\partial v} + \qquad (u,v) \in S_3$$
$$d_3(u,v)f(u,v) = c_3(u,v)$$

where $S_1$, $S_2$, and $S_3$ are the images of $R_1$, $R_2$, $R_3$ and the functions $a_{ij}(u,v)$, $h_1(u,v)$ $c_i(u,v)$, $d_i(u,v)$ are obtained from substituting in the changes of variables and collecting terms.

There are a number of coordinate changes where the inverse is known explicitly. In cases where the availability of this knowledge may unacceptably compromise security, other coordinate changes may be utilized by determining the inverse numerically. In one embodiment, the procedures described to create one-time coordinate changes using parameterized mappings with randomly chosen parameters in C. J. Ribbens, *A fast adaptive grid scheme for elliptic partial differential equations*, ACM Trans. Math. Softw., 15, (1989), 179–197; or C. J. Ribbens, *Parallelization of adaptive grid domain mappings, In Parallel Processing for Scientific Computing*, (G. Rodrique, ed.), SIAM, Philadelphia, (1989), 196–200) may be utilized to numerically determine inverses for this class of disguise and are hereby incorporated by reference in their entirety herein. In one variation of this embodiment, coordinate changes in the variables are made independently—that is: u=u(x) and v=v(y).

A sixth class of disguises include substitution with equivalent mathematical objects, such as identities, and partitions of unity. It has been found that this type of disguise improves security even when random objects are readily separated from "actual" objects of a given computation.

Examples of identities that might be utilized in this way include the following collection of expressions (18):

$$a^2 - ax + x^2 = (a^3 + x^3)/(a+x)$$
$$\log(xy) = \log x + \log y$$
$$1 + x = (1-x^2)/(1-x)$$
$$\sin(x+y) = \sin x \cos y + \cos x \sin y$$
$$\cos^2 x = \sin^2 y + \cos(x+y)\cos(x-y)$$
$$p \cos x + q \sin(y) = \sqrt{p^2+q^2} \cos(x - \cos^{-1}(p/\sqrt{p^2+q^2}))$$
$$\sin(3(x+y)) = 3 \sin(x+y) - 4 \sin^3(x+y) \qquad (18)$$

Thus, if any component of these identities appears symbolically in a computation, the equivalent expression can be substituted to disguise the problem. A general source of useful identities for this class of disguise comes from the basic tools for manipulating mathematics, e.g., changes of representation of polynomials (power form, factored form, Newton form, Lagrange form, orthogonal polynomial basis, etc.), partial fraction expansions or series expansions. Other relations that may be useful in disguises of this kind include the Gamma, Psi, and Struve functions as respectively defined by expressions (19)–(21) as follows:

$$\Gamma(x+1)=x\Gamma(x); \qquad (19)$$

$$\Psi(x+1)=\Psi(x)+1/x; \text{ and} \qquad (20)$$

$$H_{1/2}(x)=(2/\pi x)^{1/2}(1-\cos x). \qquad (21)$$

The functions of expressions (19)–(21) can be combined with selected expressions (18) to provide the following identity expressions (22) and (23):

$$\sin(x)=[\sin(\Psi(1+1/x)+x)-\sin(\Psi(1/x))\cos x]/\cos(\Psi(1/x)) \qquad (22)$$

$$\log(x)=\log\Gamma(x)+\log(\Gamma(x=1)H_{1/2}(x))-\log(1-\cos x)+½ \log(\pi x/2) \qquad (23)$$

Identities that are equal to 1 are generally referred to as partitions of unity. Partitions of unity can be readily used in a given computation. Examples of this form of identity are collected as the following expressions (24):

$$\sin^2 x+\cos^2 x=1$$

$$sec^2(x+y)-\tan^2(x+y)=1$$

$$(\tan x+\tan y)/\tan(x+y)+\tan x \tan y=1$$

$$b_1(r,x)+b_2(r,s,x)+b_3(r,s,x)+b_4(s,x)=1 \qquad (24)$$

where the $b_1$ are "hat" functions defined by:

$$b_1(r,x)=\max(1-x/r,0)$$

$$b_2(r,s,x)=\max(0, \min(x/r,(s-x)/(s-r)))$$

$$b_3(r,s,x)=\max(0,\min((x-r)/(s-r),(1-x)/(1-s)))$$

$$b_4(x,s)=\max(0,(x-s)/(1-s))$$

each of which is a piecewise linear function with breakpoints at 0, r, s and/or 1. Generalizations of this partition of unity are known for an arbitrary number of functions, arbitrary polynomial degree, arbitrary breakpoints, and arbitrary smoothness (less than the polynomial degree). Partitions of unity facilitate the introduction of unfamiliar and unrelated functions into symbolic expression. Thus the second partition of expressions (24) above becomes the following expression (25):

$$sec^2(y_7(x)+u(1.07296, x))-\tan^2(y_7(x)+u(1.07296,x))=1 \qquad (25)$$

where $y_7(x)$ is the Bessel function of fractional order and u(1.07296, x) is the parabolic cylinder function. R. F. Boisvert, S. E. Howe, and D. K. Kahaner, *Guide to Available Mathematical Software (GAMS): A framework for the management of scientific software*, ACM Trans. Math. Software, 11, (1995), 313–355, lists 48 classes of functions for which library software is available and is hereby incorporated by reference.

Further, disguises may be enhanced by using functions and constants that appear in the actual arguments AA. Thus, if 2.70532, $x^2$, cos(x) and log(x) initially appear in ap ordinary differential equation, one could use identities that involve these objects or closely related ones, e.g., 1.70532, $2x^2-1$, cos(2x) or log (x+1). Because of the difficulty in establishing identities, it is expected that using several identities in a mathematical model provides a corresponding increase in the degree of security. Further, one-time identities as follows may be provided. For example, there are several library programs to compute the best piecewise polynomial approximation to a given function f(x) with either specified or variable breakpoints as described in C. deBoor and J. R. Rice, *An adaptive algorithm for multivariate approximation giving optimal convergence rates*, J. Approx. Theory, 25, (1979), 337–359; and C. deBoor. *A Practical Guide to Splines*, SLAM Publications, (1978) that are hereby incorporated by reference in their entirety herein. It should be appreciated that with these techniques, the number of breakpoints and/or polynomial degrees can be increased to provide arbitrary precision in these approximations. Thus given the following expression (26):

$$f(x)=\sin(2.715x+0.12346)/(1.2097+x^{1.0765}) \qquad (26)$$

or that f(x) is computed by a 1000 line code, one can use these library routines to replace f(x) by a code that merely evaluates a piecewise polynomial with "appropriate" coefficients and breakpoints. One time identities may also use the classical mathematical special functions that have parameters, e.g., incomplete gamma and beta functions, Bessel function, Mathieu functions, spheroidal wave functions, and parabolic cylinder functions as further described in M. Abramowitz and I. A. Stegun, *Handbook of Mathematical Functions, Appl. Math. Series 55, National Bureau of Standards.*, U.S. Govt. Printing Office, (1964) that is hereby incorporated by reference in its entirety herein.

Having described a few different classes of disguises as listed in table II, it should be appreciated that this description is not intended to be exclusive, it being understood that other types of disguises as would occur to those skilled in the art are also contemplated. Further, while in some embodiments it is desirable to apply only one particular disguise operation prior to outsourcing, in other embodiments it may be desirable to enhance the degree of security by applying multiple disguise operations. Indeed, for a given type of outsourced computation, within each class of table II there may be several or many disguises that can be simultaneously utilized with or without disguises of one or more other classes. Likewise, some classes of disguises in library 234 may be better suited to obscure or hide the actual arguments AA for a given type of outsourced computation than others. For example, it has been found that coordinate system changes are one of the more effective disguises for outsourced computations involving optimization and solutions of nonlinear systems.

The selection of one or more disguises from library 234 and construction of a multiple disguise procedure may be based on several factors. One factor is the motivation to outsource. If the motivation includes a relative savings in processing time, then the time taken to perform operations 220, 260 should not defeat such savings. For example, if the problem domain involves n×n matrices, then an operation count for operations 220, 260 on the order of $n^2$ might be acceptable to provide security for an outsourced computation that has an operation count on the order of $n^3$, as is commonly associated with matrix inversion and multiplication. However, if the motivation concerns other matters such as availability of software or programming expertise, the relative processing time may be unimportant. Moreover, it should be understood that the invention is not intended to be limited to a particular motivation or relative distinction regarding the outsourced computation.

Another factor is the invertability of the disguised result DR once the outsourced computation is completed. For example, it may be desired that the disguise be fully invertible—that is, after the disguise is applied and the disguised computation made, the actual answer SA may be recovered that corresponds to the actual arguments AA. Still, in other embodiments, it may only be desired that an approximated recovery be performed, so that the degree of recovery of actual answer SA may vary.

Still another factor is the degree of security afforded by a given form of disguise. Ideally, once a given disguise is applied, agent A (computing center 50) should not be able to discover either the original computation or its result; however, in practice, the level of security utilized may vary for a given situation. Yet another factor to consider is the relative cost of a particular disguise procedure. Generally, this operates as a trade-off with the degree of security sought.

Program 230 is arranged to provide sequencing control of a disguise, outsourcing, retrieval and disguise inversion actions. As part of operation 220 illustrated in FIG. 3, program 230 receives the actual arguments AA as input 222 and the type of computation selected to be outsourced as input 224. In response, program 230 selects one or more disguise operations from library 234 in accordance with a suitable disguise procedure for inputs 222, 224. Program 230 may include a number of predetermined disguise procedures based on input 222 and/or input 224, operator input, one or more routines to synthesize a suitable procedure, or a combination of these.

In one embodiment, a routine to synthesize or suggest the disguise procedure may be determined, at least in part, from inputs corresponding to one or more of the previously described factors listed as follows: (a) outsourced computation type, (b) type/quantity of actual arguments, (c) processing constraints of subsystem 30 (such as the amount of preparation/recovery processing to be performed by subsystem 30), (d) motive for outsourcing, (e) degree of security desired, and (f) cost constraints. In still other embodiments, these factors may not be considered by program 230. Indeed, in one alternative embodiment, the particular disguise procedure is completely manually entered by an operator.

Once the disguise procedure is determined, program 230 constructs the disguised arguments DA using the selected disguise operations from library 234. Program 230 also coordinates the storage of appropriate disguise parameters in outsourced computation record 236 for later retrieval to recover the actual answer SA. Among its disguise operation routines, program 230 includes one or more routines to provide appropriate random objects with random number generators 232 as needed for a particular disguise procedure. A record 236 is maintained by program 230 for each outsourced computation at least until a result is received and processed via operation 260. Typically, the recorded parameters include relevant random numbers or corresponding keys for one or more random numbers, the selected disguise operations applied, a reference to actual arguments AA corresponding to the given outsourced computation, and such other information as required to recover actual answer SA. After the disguised arguments DA are created, they are sent to the selected agent A, such as computing center 50, as output 250.

Depending on a given disguise procedure, a substantial number of "keys" may be needed to reconstruct an actual answer SA from a disguised result DR. For example, if a significant number of random objects are used, random number generator parameters, generator seeds, related coefficients and/or perhaps the random numbers themselves may be maintained in a corresponding record 236. It may be desirable to avoid keeping and labeling these keys individually. In one alternative embodiment of program 230, a master key is created that may be stored in record 236 in lieu of a large number of keys for a given outsourced computation. This master key is provided to create an arbitrary number of derived keys or "sub-keys." For this embodiment, let K be the master key and $k_i$, $i=1,2,\ldots,N$ be the sub-keys (where "i" is an integer index variable). The sub-keys $k_i$ are derived from K by a procedure P such as the following:

(a) represent K as a long bit string (a 16 character key K generates 128 bits using ASCII notation);

(b) generate a bit string of length 128 bits with a random number generator G for each $i=1,2,\ldots,N$; and (c) apply the randomly generated bit string of length 128 as a mask on the representation of K—select those bits of K where the random bit is one.

Thus, with a single key K and a random number generator G (such as one of generators 232), we can create many sub-keys. It should be appreciated that for procedure P, each $k_i$ is easily derived from K; however, knowledge of even a substantial set of the $k_i$ gives no information about K even if the generation procedure P is known. Correspondingly, because many of the sub-keys may be seeds or parameters for random number generators, large sets of random numbers can be used with a reduced risk of revealing the master key or other sub-keys even if a statistical attack on this aspect of the disguise is successful.

Referring to FIG. 4, program 230 receives disguised result DR from computing center 50 as input 262. Program 230 references the corresponding record 236 to determine the processing needed to recover actual answer SA from the disguised result DR. The actual answer SA is provided as output 264 by program 230.

Having described process 120 and operations 220, 260, the following examples of different types of outsourced computations are described, it being understood that these examples are merely illustrative and should not be considered limiting or restrictive in character. These examples are described in terms of system 20 and process 120; however, other systems and processes may be utilized to execute these examples as would occur to those skilled in the art. Further, it should be understood that program 230 may include instructions or routines in accordance with one or more of the disguise operations of these examples, but one or more different programs and/or operator input of one or more operations may be utilized. Likewise, computer 52 of computing center 50 may be programmed to execute the outsourced computations associated with these examples, or different agents A may be used for the various procedures described in the examples.

EXAMPLE ONE

Matrix multiplication of two n×n matrices $M_1$ and $M_2$ may be readily disguised in accordance with a first example of the present invention designated as disguise procedure DP1. Matrices $M_1$ and $M_2$ are the actual arguments AA to be outsourced. For DP1, the kronecker delta function, $\delta_{x,y}$ is utilized which equals 1 if x=y and 0 if x≠y. Subsystem 30 performs the following stages a.–c. to prepare disguised arguments DA in accordance with DP1:

a. creates (i) three random permutations π1, π2, and π3 of the integers $\{1,2,\ldots,n\}$ and (ii) three sets of non-zero random numbers $\{\alpha_1, \alpha_2, \ldots, \alpha_n\}$, $\{\beta_1, \beta_2, \ldots \beta_n\}$, and $\{\gamma_1, \gamma_2, \ldots \gamma_n\}$;

b. creates matrices $P_1$, $P_2$, and $P_3$ where $P_1(i,j)=\alpha_i\delta_{x1(i)j}$, $P_2(i,j)=\beta_i\delta_{x2(i)j}$, and $P_3(i,j)=\gamma_i\delta_{x3(i)j}$ (these matrices are readily invertible, e.g., $P_1^{-1}=(\alpha_j)^{-1}\delta_{\pi 1^{-1}(i)j}$); and c. computes the matrix $X=P_1M_1P_2^{-1}$ (such that $X_{(i,j)}=(\alpha_i/\beta_j)M_1(\pi 1(i), \pi 2(j)))$, and $Y=P_2M_2P_3^{-1}$.

Matrices X and Y define the disguised arguments DA for DP1. Subsystem 30 sends the matrices X and Y to computing center 50. Computing center 50 determines the product $Z=XY=(P_1M_1P_2^{-1})(P_2M_2P_3^{-1})=P_1M_1M_2P_3^{-1}$ and sends matrix Z back to subsystem 30. Matrix Z is the disguised result DR for DP1.

Subsystem 30 computes locally, in $O(n^2)$ time, the matrix $P_1^{-1}ZP_3$, which equals $M_1M_2$, the actual answer SA; where the function $O(n^2)$ represents processing time on the order of and proportional to $n^2$. It should be appreciated that the outsourced computation by computing center 50 for DP1 requires processing proportional to $n^3$ as represented by $O(n^3)$.

EXAMPLE TWO

At the expense of more complex disguise preparation by subsystem 30, a greater degree of security may be provided in a second matrix multiplication example designated as disguise procedure DP2. For DP2, subsystem 30 performs the following stages a.–c.:

a. compute matrices $X=P_1M_1P_2^{-1}$ and $Y=P_2M_2P_3^{-1}$ in accordance with disguise procedure DP1;

b. select two random n×n matrices $S_1$ and $S_2$ and generate four random numbers $\beta$, $\gamma$, $\beta'$, $\gamma'$ such that $(\beta+\gamma)((\beta'+\gamma')(\gamma'\beta-\gamma\beta')\neq 0$; and c. compute the six matrices $X+S_1$, $Y+S_2$, $\beta X-\gamma S_1$, $\beta Y-\gamma S_2$, $\beta'X-\gamma'S_1$, $\beta'Y-\gamma'S_2$.

The following three matrix multiplications are then outsourced by subsystem 30 to computing center 50: (a) $W=(X+S_1)(Y+S_2)$; (b) $U=(\beta X-\gamma S_1)(\beta Y-\gamma S_2)$; and (c) $U'=(\beta'X-\gamma'S_1)(\beta'Y-\gamma'S_2)$. The results are returned by computing center 50 to subsystem 30. Subsystem 30 then locally computes matrices V and V'; where $V=(\beta+\gamma)^{-1}(U+\beta\gamma W)$ and $V'=(\beta'+\gamma')^{-1}(U'+\beta'\gamma'W)$. It should be appreciated that $V=\beta XY+\gamma S_1 S_2$, and $V'=\beta'XY+\gamma'S_1S_2$. Subsystem 30 outsources the computation: $(\gamma'\beta-\gamma\beta')^{-1}(\gamma'V-\gamma V')$ as the disguised arguments DA which equal the product XY. Computing center 50 returns the remotely computed matrix product XY (the disguised result DR); and subsystem 30 computes $M_1M_2$ from XY according to: $P_1^{-1}XYP_3=P_1^{-1}(P_1M_1P_2^{-1})(P_2M_2P_3^{-1})P_3=M_1M_2$.

EXAMPLE THREE

Disguise procedure DP3 as follows provides a third example of a disguised outsourced matrix multiplication. DP3 utilizes DP2 and further imposes control on the length of random number sequences generated to provide a more robust random number generator disguise. For DP3, subsystem 30 defines L as the maximum length for a sequence from a random number generator so that $M=[m/L]$ is the number of distinct random number generators 232 needed. Let $G(A(i))$, $i=1,2 \ldots$ , be one-time random number generators. Each random generator has a vector $A(i)$ of 12 parameters/seeds. Correspondingly, non-zero vectors are provided for the three matrices $P_1$, $P_2$, $P_3$ used to disguise $M_1$ and $M_2$. Computing center 50 receives $X=P_2M_1P_2^{-1}$ and $Y=P_2M_2P_3^{-1}$ for the outsourced multiplication and returns matrix Z to subsystem 30. This approach further hampers the ability to successfully impose a statistical attack. Further, as long as computing center 50 is without information about $M_1$ and $M_2$, it appears a statistical attack is the only type of attack available.

EXAMPLE FOUR

In a fourth example, disguise procedure DP4 for the multiplication of non-square matrices is utilized; where $M_1$ is l×m and $M_2$ is m×n, and hence: $M_1M_2$ is l×n. For DP4, any of the procedures DP1, DP2, DP3 may be utilized with the sizes of the $P_i$ and $S_i$ matrices being selected accordingly. For matrices $S_i$ of DP2 or DP3, $S_1$ is of l×m dimension and $S_2$ is of m×n dimension, because each of them is added to matrices having such dimensions. For the matrices $P_i$, it should be appreciated that $P_i$ is constrained to be: (i) square so that it may be inverted, (ii) sized to be compatible with the number of rows of the matrices that it (or its inverse) left-multiplies, and (iii) sized to be compatible with the number of columns of the matrices that it (or its inverse) right-multiplies. For example, as $P_2$ is used for left-multiplying $M_2$, and $M_2$ has m rows, $P_2$ should be m×m. The constraint that $P_2^{-1}$ right-multiplies $M_1$ is compatible with the previous one, because $M_1$ has m columns.

EXAMPLE FIVE

In a fifth example, dimension hiding is included for an outsourced matrix multiplication as disguise procedure DP5. For DP5, subsystem 30 defines $M_1$ with dimension a×b matrix and $M_2$ with dimension b×c matrix. Two or more matrix multiplications using one of the previously described matrix multiplication procedures DP1–DP4 are performed instead of just one. These substitute multiplications are performed with matrices having dimensions a', b', c' different from a, b, c. Hiding the dimensions can be done by either enlarging or shrinking one (or a combination of) the relevant dimensions. A dimension a is "enlarged" if a'>a, and "shrunk" if a'<a (similarly for b' and c'). Although for convenience enlargement and shrinking are described separately, it should be understood that these operations alternatively can be done in combination.

Enlarging a (so that it becomes a'>a) is performed by subsystem 30 by appending a'–a additional rows, having random entries, to matrix $M_1$. As a result, product $M_1M_2$ has a'–a additional rows that may be ignored. Enlarging c (so that c'>c) is performed by subsystem 30 by appending c'–c additional columns, having random entries, to matrix $M_2$, causing the resulting product of $M_1M_2$ to have c'–c additional columns, that can be ignored.

Alternatively or additionally, subsystem 30 may enlarge vector b by appending b'–b extra columns to the first matrix and b'–b extra rows to the second matrix. It should be appreciated that these additional rows and columns cannot have completely random entries because they may interact to corrupt the outsourced calculation result. Accordingly, to avoid any corruption, subsystem 30 preserves the dimensions of the resulting product matrix $M_1M_2$ by: (a) numbering the b'–b extra columns 1,2, . . . , b'–b, and similarly numbering the extra rows 1,2, . . . , b'–b; (b) selecting the entries of the odd-numbered extra columns and rows to be random and zero, respectively; and (c) selecting the entries of the even-numbered extra columns and rows to be zero and random, respectively. These operations assure that enlarging b does not cause a change in the matrix product $M_1M_2$. For embodiments that enlarge b in conjunction with enlargements of a and/or c, the enlargement of b is preferably performed first.

Dimensional shrinking of a may be performed as part of DP5 with subsystem 30 by partitioning the first matrix $M_1$ into two matrices: $M_1'$ having the first a'–a rows and $M_1''$ having the last a' rows. Matrix $M_2$ stays the same, but to get the a×c matrix, both products $M_1'M_2$ and $M_1''M_2$ are outsourced. Dimensional shrinking of c is performed by partitioning the second matrix $M_2$ into two matrices: $M_2'$ having the first c'–c columns and $M_2''$ having the last c' columns. Matrix $M_1$ stays the same, but to get the a×c matrix, both products $M_1M_2'$ and $M_1M_2''$ are outsourced.

Additionally or alternatively, DP5 may include dimensional shrinking of b. Subsystem 30 shrinks b by partitioning both matrices $M_1M_2$ into two matrices. Matrix $M_1$ is partitioned into matrix $M_1'$ having the first b–b' columns and matrix $M_1''$ having the last b' columns. Matrix $M_2$ is partitioned into matrix $M_2'$ having the first b–b' rows and matrix $M_2''$ having the last b' rows. The a×c product matrix sought is then $M_1'M_2'+M_1''M_2''$.

DP5 also optionally includes performing the three above shrinking operations together. This option results in a partition of each of matrices $M_1$ and $M_2$ into four matrices. Using, for example, the notation $M_1([i:j], [k:l])$ for the submatrix of $M_1$ whose rows are in the interval [i:j] and whose columns are in the interval [k:l], then computing $M_1M_2$ requires the following four computations (a)–(d):

$M_1([1:a-a'],[1:b-b'])M_2(1:b-b'],[1:c-c'])+M_1([1:a-a'],[b-b'+1:b])M_2([b-b'+1:b),(1:c-c'])$;   (a)

$M_1([1:a-a'],[1:b-b'])M_2(1:b-b'],[c-c'+1:c])+M_1([1:a-a'],[b-b'+1:b])M_2([b-b'+1:b],[c-c'+1:c])$;   (b)

$M_1([a-a'+1:a],[1:b-b'])M_2([1:b-b'],[1:c-c'])+M_1([a-a'+1:a],[b-b'+1:b])M_2([b-b,+1:b],[1:c-c'])$; and   (c)

$M_1([a-a'+1:a],[1:b-b'])M_2([1:b-b'],[c-c'+:c])+M_1([a-a'+1:a],[b-b'+1:b]M_2([b-b'+1:b],[c-c'+1:c])$.   (d)

EXAMPLE SIX

In a sixth example, a secure matrix inversion disguise procedure DP6 is provided for matrix M; where the entries of matrix M are the actual arguments AA. For DP6, the following steps a.–j. are performed:

a. Subsystem 30 selects a random n×n matrix S.

b. Subsystem 30 securely outsources the matrix computation $\hat{C}=MS$ by executing one of the previously described procedures DP1–3 or DP5 as a subroutine of DP6.

c. Subsystem 30 generates matrices $P_1$, $P_2$, $P_3$, $P_4$, $P_5$ using the same method as for the $P_1$ matrix of DP1. That is, $P_1(i,j)=a_i\delta_{\pi1(i)j}$, $P_2(i,j)=b_i\delta_{\pi2(i)j}$, $P_3(i,j)=c_i\delta_{\pi3(i)j}$, $P_4(i,j)=d_i\delta_{\pi4(i)j}$, and $P_5(i,j)=e_i\delta_{\pi5(i)j}$, where $\pi1$, $\pi2$, $\pi3$, $\pi4$, $\pi5$ are random permutations, and where $a_i$, $b_i$, $c_i$, $d_i$, $e_i$ are random numbers.

d. Subsystem 30 computes the matrices: $Q=P_1\hat{C}P_2^{-1}=P_1MSP_2^{-1}$ and $R=P_3SP_4^{-1}$.

e. Subsystem 30 outsources the computation of $Q^{-1}$, to computing center 50.

f. If computing center 50 succeeds in determining $Q^{-1}$, it returns $Q^{-1}$ to subsystem 30; otherwise computing center 50 indicates Q is not invertible to subsystem 30. If this indication is received by subsystem 30, it tests whether:

(i) S is invertible by first computing $\hat{S}=S_1SS_2$; where $S_1$ and $S_2$ are matrices known to be invertible, and outsources matrix $\hat{S}$ to computing center 50 for inverting. It should be understood that the only interest is whether $\hat{S}$ is invertible or not, not in its actual inverse. The fact S is discarded makes the choice of $S_1$ and $S_2$ less crucial; however, choosing $S_1$ and $S_2$ to be the identity matrices may not be desirable because it may make it easier to learn how the random matrices are generated.

(ii) If computing center 50 can invert $\hat{S}$, then S is invertible, and hence M is not invertible. If the computing center 50 indicates $\hat{S}$ is not invertible, then S is not invertible. In that case, operations (a)–(f) of DP6 are repeated with a different S.

g. If Q is invertible, then, in accordance with the observation that $Q^{-1}=P_2S^{-1}M^{-1}P_1^{-1}$, subsystem 30 computes the matrix $T=P_4 P_2^{-1}Q^{-1}P_1P_5^{-1}$ which is equal to $P_4S^{-1}M^{-1}P_5^{-1}$.

h. Subsystem 30 outsources the computation of Z=RT to computing center 50 which serve as disguised arguments DA. One of DP1–DP3 or DP5 may be utilized as a subroutine for this operation.

i. Computing center 50 returns Z, the disguised result DR, to subsystem 30.

j. Observing that $Z=P_3SP_4^{-1}P_4S^{-1}M^{-1}P_5^{-1}=P_3M^{-1}P_5^{-1}$, subsystem 30 computes $P_3^{-1}ZP_5$, which equals $M^{-1}$, the actual answer SA.

EXAMPLE SEVEN

In a seventh example, dimensional hiding is incorporated into secure matrix inversion in disguise procedure DP7. For DP7, hiding dimension n for matrix inversion may be achieved by: (a) using the dimension-hiding version of matrix multiplication described in connection with procedure DP5 of Example Five, and (b) modifying stage "f." of DP6 to perform the inversion of Q by inverting a small number of n'×n' matrices where n' differs from n. Otherwise DP7 is performed the same as DP6. DP7 provides an option of enlarging the dimension of Q, (i.e., n'>n) for which stage "f." of DP6 is modified to invert one n'×n' matrix Q' defined as follows; where the matrices O', O'' are of n×(n'−n) and (n'−n)×n dimension, respectively, and all of whose entries are zero, and S' is an (n'−n)×(n'−n) random invertible matrix:

$Q'([1:n],[1:n])=Q$;

$Q'([1:n],[n+1:n'])=O'$;

$Q'([n+1:n'],[1:n])=O''$; and $Q'([n+1:n'],[n+1:n'])=S'$.

It should be understood that the inversion of Q' is not performed by sending it directly to computing center 50 as the zeros in it may reveal n. Rather, the inversion of Q is performed in accordance with DP6.

Dimension shrinking may optionally be included in DP7 based on the premise that if $X=Q([1:m],[1:m])$ is invertible (m<n), $Y=Q([m+1:n],[m+1:n])$, $V=Q([1:m],[m+1:n])$, $W=Q([m+1:n],[1:m])$, and $D=Y-WX^{-1}V$ is invertible, then:

$Q^{-1}([1:m],[1:m])=X^{-1}+X^{-1}VD^{-1}WX^{-1}$;

$Q^{-1}([1:m],[m+1:n])+-X^{-1}VD^{-1}$;

$Q^{-1}([m+1:n],[1:m])=-D^{-1}WX^{-1}$; and $Q^{-1}([m+1:n],[m+1:n])=D^{-1}$.

Correspondingly, for DP7, Q is partitioned into four matrices X, Y, V, W. One of the secure matrix multiplication techniques DP1–DP3 or DP5 and the secure matrix inversion of procedure DP6 are utilized to determine the four pieces of $Q^{-1}$.

EXAMPLE EIGHT

In an eighth example of the present invention, secure outsourcing of a linear system of equations is provided as disguise procedure DP8. For a system of linear equations, the actual arguments may be represented in the form Mx=b; where M is a square n×n matrix, b is a vector of dimension n, and x is a vector of n unknowns. For DP8, the following stages a.–e. are performed:

a. Subsystem 30 selects a random n×n matrix B and a random number $j \in \{1,2,\ldots,n\}$ and replaces the j-th row of B by b such that: $B+[B_1, \ldots B_{j-1}, B_{j+1}, \ldots, B_n]$.

b. Subsystem 30 generates matrices $P_1$, $P_2$, $P_3$ using the same method as for the $P_1$ matrix in DP1, such that $P_1(i,j)=a_i\delta_{\pi 1(i)j}$, $P_2(i,j)=b_i\delta_{\pi 2(i)j}$, $P_3(i,j)$ $c_i\delta_{\pi 3(i)j}$ where $\pi 1$, $\pi 2$, $\pi 3$ are random permutations, and where $a_i$, $b_i$, $c_i$, are random numbers.

c. Subsystem 30 computes the matrices $\hat{C}=P_1MP_2^{-1}$ and $\hat{G}=P_1BP_3^{-1}$.

d. Subsystem 30 outsourcers the solution of the linear system $\hat{C}x=\hat{G}$ to computing center 50. If $\hat{C}$ is singular then computing center 50 returns a message with this indication; otherwise center 50 returns: $\hat{U}=\hat{C}^{-1}\hat{G}$ e. Subsystem 30 computes $X=P_2^{-1}\hat{U}P_3$ which equals $M^{-1}B$, because: $P_2^{-1}\hat{U}P_3=P_2^{-1}\hat{C}^{-1}\hat{G}P_3=P_2^{-1}P_2M^{-1}P_1^{-1}P_1BP_3^{-1}P_3=M^{-1}B$; where, the answer x (actual answer SA) is the j-th column of X, i.e., $x=X_j$.

EXAMPLE NINE

In a ninth example, dimensional hiding of a linear system of equations is provided by disguise procedure DP9. For DP9, dimension n of the linear system of equations is hidden by embedding the problem Mx=b into a larger problem M'x'=b' of the size n'>n. In what follows, if X is an r×c matrix and Y is and r'×c'(r<r'), the notation "Y=X(*,[1:c])" means that Y consists of as many copies of X as needed to fill the r' rows of Y. It should be appreciated that the last copy could be partial, if r does not divide r'. For example, if r'=2.5r then the notation would mean that:

$Y([1:r],[1:c])=Y([r+1:2r],[1:c])=X$, and $Y([2r+1:2.5r],[1:c])=X([1:0.5r],[1:c])$.

The larger problem M'x'=b' of size n'>n is defined as follows. The matrix M' and vector b' are defined as follows, where: the matrices O' and O" are of dimension n×(n'-n) and (n'-n)×n, respectively, all of whose entries are zero; S' is an (n'-n)×(n'-n) random invertible matrix, and y is a random vector of length n'-n:

$M'([1:n],[1:n])=M;$ $M'([1:n], [n+1:n'])=O';$ $M'([n+1:n'],[1: n])=O";$ $M'([n+1:n'],[n+1:n])=S';$ $b'([1:n])=b;$ and $b'([n+1:n'])=S'y.$ Then the solution x' to the system M'x'=b' is x' ([1:n])=x and x' ([n+1, n'])=y. Note that the zero entries of O' and O" do not betray n because these zeroes are hidden when $\hat{C}=P_1MP_2^{-1}$ is computed. As an alternative, matrices O' and O" need not have zeroes if:

a. O' is a random matrix (rather than a matrix of zeros);

b. O"M(*, [1:n]);

c. S'=O'(*, [n+1:n']); and d. b'=(b+O'y)(*).

If the selection of random values for y and matrix O'result in a noninvertible M', then the corresponding operations are repeated until an invertible M' results. For an invertible M', the solutions x' to the system M'x'=b' remains x'([1:n])=x and x' ([n+1, n'])=y because Mx+O'y=b'([1:n])=b+O'y and hence Mx=b.

EXAMPLE TEN

A tenth example is provided as disguise procedure DP10 for a secure quadrature computation to be outsourced. For DP10, the objective is to provide an estimate corresponding to the following expression (27):

$$\int_a^b f(x)dx \quad (27)$$

with accuracy designated as "eps". Expression (27) correspond to the actual arguments AA to be disguised by DP10. DP10 proceeds in accordance with stages a.–e. as follows:

a. Subsystem 30 chooses $x_1=a$, $x_2=b$ and 5 ordered, random numbers $x_i$ in [a,b] and 7 values $v_i$ with a range defined such that min $|f(x)|\approx M_1 \leq M_2 \approx$ max $|f(x)|$; where $M_1$ and $M_2$ are estimations and the operators min $|f(x)|$ and max $|f(x)|$ return the minimum and maximum value of f(x), respectively.

b. Subsystem 30 creates a cubic spline g(x) with breakpoints $x_i$ such that $g(x_i)=v_i$.

c. Subsystem 30 integrates g(x) from a to b to obtain $I_1$ and sends g(x)+f(x) (the disguised arguments DA) and eps to computing center 50 for numerical quadrature.

d. Computing center 50 returns $I_2$ (the disguised result DR) to subsystem 30.

e. Subsystem 30 computes $I_2-I_1$ which is the actual answer SA.

EXAMPLE ELEVEN

In an eleventh example, a disguise procedure DP11 for quadrature computations is provided that is more robust with respect to an approximation theoretic attack. DP11 modifies DP10 to add a second disguise function. Specifically, to assure that f(x) has a smoothness characteristic comparable to g(x). Further security enhancements may optionally be incorporated by using reverse communication as described in J. R. Rice, *Numerical Methods, Software, and Analysis,* 2d ed., Academic Press (1993), which is hereby incorporated by reference in its entirety, or by replacing f(x) with a high accuracy approximation as previously discussed in connection with random function determinations.

EXAMPLE TWELVE

In a twelfth example, disguise procedure DP12 provides for secure outsourcing of a convolution computation of two vectors $M_1$ and $M_2$ of size n, indexed from 0 to n-1 (the actual arguments AA). It should be appreciated that the convolution M, of $M_1$ and $M_2$, is a new vector of the size $2n-1$, denoted by $M=M_1 \otimes M_2$, such that expression (28) follows:

$$M(i) = \sum_{k=0}^{\min(i,n-1)} M_1(k)M_2(i-k). \qquad (28)$$

DP12 includes the following stages a.–f.:
a. Subsystem 30 randomly selects vectors $S_1$, $S_2$, of size n and five positive numbers $\alpha$, $\beta$, $\gamma$, $\beta'$, $\gamma'$ such that: $(\beta+\alpha\gamma)(\beta'+\alpha\gamma')(\gamma'\beta-\gamma\beta')\neq 0$.
b. Subsystem 30 computes six vectors: $\alpha M_1+S_1$, $\alpha M_2+S_2$, $\beta M_1-\gamma S_1$, $\beta M_2-\gamma S_2$, $\beta' M_1-\gamma' S_1$, $\beta' M_2+\gamma S_2$.
c. Subsystem 30 outsources to computing center 50 the three convolutions defined by expressions (29)–(31) that follow:

$$W=(\alpha M_1+S_1) \otimes (\alpha M_2+S_2); \qquad (29)$$

$$U=(\beta M_1-\gamma S_1) \otimes (\beta M_2-\gamma S_2); \text{ and} \qquad (30)$$

$$U'=(\beta' M_1-\gamma' S_1) \otimes (\beta' M_2-\gamma' S_2). \qquad (31)$$

d. Computing center 50 returns W, U, and U' to subsystem 30 as the disguised results DR.
e. Subsystem 30 computes the vectors according to expressions (32) and (33) as follows:

$$V=(\beta+\alpha\gamma)^{-1}(\alpha U+\beta\gamma W) \qquad (32)$$

$$V'=(\beta'+\alpha\gamma')-1(\alpha U+\beta'\gamma'W) \qquad (33)$$

where it may be observed that $V = \alpha\beta M_1 \otimes M_2 + \gamma S_1 \otimes S_2$, and $V'=\alpha\beta' M_1 \otimes M_2+\gamma' S_1 \otimes S_2$.
f. Subsystem 30 computes $\alpha^{-1}(\gamma'\beta-\gamma\beta')^{-1}(\gamma'V-\gamma V')$, which equals the actual answer SA, $M_1 \otimes M_2$.

Further, security of an outsourced convolution computation may be enhanced by hiding the dimension. The dimension may be expanded for a convolution computation by "padding" the two input vectors with zeroes. The zeroes do not betray the value of n because they are hidden through the addition of random numbers. Alternatively or additionally, the dimension may be hidden by shrinking the problem size with two operations: (a) replacing the convolution size n by three convolutions of size n/2 each, and then (b) recursively hiding (by shrinking or expanding) the sizes of these three convolutions with a recursion depth of O(1).

EXAMPLE THIRTEEN

In a thirteenth example, disguise procedure DP13 provides for secure outsourcing of the solution to a differential equation defined as a two point boundary value problem in expressions (34)–(36) that follow:

$$y''+a_1(x)y'+a_2(x)y=f(x,y); \qquad (34)$$

$$y(a)=y_0; \text{ and} \qquad (35)$$

$$y(b)=y_1. \qquad (36)$$

The differential equation of expression (34) and the boundary conditions of expressions (35) and (36) are the actual arguments SA for DP13. DP13 proceeds in accordance with stages a.–d. as follows:

a. Subsystem 30 selects a cubic spline g(x) and creates the function of expression (37) that follows:

$$u(x)=g''+a_1(x)g'+a_2(x)g. \qquad (37)$$

b. Subsystem 30 sends the problem defined by the following expressions (38)–(40) as disguised arguments DA to computing center 50 for solution:

$$y''+a_1(x)y'+a_2(x)y=f(x,y)+u(x); \qquad (38)$$

$$y(a)=y_0+u(a); \text{ and} \qquad (39)$$

$$y(b)=y_1+u(b). \qquad (40)$$

c. Computing center 50 solves the problem corresponding to expressions (38)–(40) and returns z(x), the disguised result DR, to subsystem 30.
d. Subsystem 30 computes the actual answer, z(x)–g(x).

EXAMPLE FOURTEEN

The outsourcing of computations may involve the transmission of a substantial amount of symbolic input, either pure mathematical expressions or high level programming language (Fortran, C, etc.) code. Such code can compromise security if provided without a disguise during outsourcing. Disguise procedure DP14 of this fourteenth example describes various techniques to disguise symbolic information and to address security risks posed by "symbolic code analysis" attacks. Various operations that may be alternatively or collectively performed in accordance with DP14 include:
(a) reducing or eliminating all name information in the code, including the deletion of all comments and/or removal of all information from variable names;
(b) utilizing approximations of basic mathematical functions, such as sine, cosine, logarithm, absolute value, exponentiation, to reduce the likelihood such functions can be readily identified by code inspection (techniques may include, for example, one time elementary function approximations for these functions using a combination of a few random parameters along with best piecewise polynomial, variable breakpoint approximations);
(c) applying symbolic transformations such as changes of coordinates, changes of basis functions or representations, and use of identities and expansions of unity; and/or
(d) utilizing reverse communication to avoid passing source code for numerical computations to agent A and to hide parts of the original computation.

In one instance of reverse communication according to this example, it may be desirable to avoid passing the code for the function u(x) to computing center 50; however, computing center 50 may be selected to do computations to provide x before u(x) needs to be determined, and further computing center 50 may selected to perform computations involving u(x) after u(x) is made available. Accordingly, subsystem 30 receives x from computing center 50, evaluates u(x), and returns u(x) to computing center 50 for further processing in accordance with this reverse communication embodiment.

In one instance of symbolic transformation according to this example, the readily recognizable differential equation given by expression (41) as follows:

$$y''+x^*\cos(x)y'+(X^2+\log(x))y=1+x^2, \qquad (41)$$

is disguised by applying the following symbolic transformations defined by expressions (42)–(47) that follow:

$$\cos^2 x - \sin^2 y = \cos(x+y)\cos(x-y); \quad (42)$$

$$\sec^2(x+y) - \tan^2(x+y) = 1; \quad (43)$$

$$(\tan x + \tan y)/\tan(x+y) + \tan x \tan y = 1; \quad (44)$$

$$1+x = (1-x^2)/(x-x); \quad (45)$$

$$\sin(3(x+y)) = 3\sin(x+y) - 4\sin^3(x+y); \text{ and} \quad (46)$$

$$a^2 ax + x^2 = (a^3 + x^3)/(a+x). \quad (47)$$

By rearranging and renaming, a more complicated result may be obtained as represented by expression (48); where the Greek letters are various constants that have been generated:

$$(\beta\cos^2 x - \delta)y'' + x[\cos x/(\gamma\cos(x+1)) - \\ \cos x \sin(x+1)\tan(x+1)] * [\varepsilon - \sin^2 x + \varepsilon\sin(x+1) - \\ \sin^2 x \sin(x+1)]y' + [\beta(x\cos x)^2 - \eta(x+\log x) + \theta\cos x \log(x^2)] * \\ [\eta\sin x + \delta\tan x + [\chi\sin x + \mu\cos x + v)/\tan(x+2)]y = \\ (1+x^2)[\sin x + \eta\cos x] \quad (48)$$

Moreover, by further renaming and implementation of some elementary functions, including the replacement of the variable names by the order in which the variables appear, expression (48) is becomes expression (49) as follows:

$$y''[x01 * x02(x) - x03] + y'[x04 * x/(x05\cos(x+1) + \\ \cos x * x06(x)\tan(x+1)] * [x07 - \sin^2 x - x08(x)\sin^2 + \\ x07\sin^2(x+1)] + y[x01 * (x*(x09(x))^2 - x10(x+\log x) + \\ x11\cos x \log x^2] * [x12 * x13(x) + x14\tan x + x15\sin x + \\ x16\cos x + x17)] = \sin x + x18 * (1+x^2) * x09(x) + \\ x19(x) + x10 * x^2\cos x. \quad (49)$$

EXAMPLE FIFTEEN

In example fifteen, disguise procedure DP15 is applied to enhance security of an outsourced computation for detecting edges of an image represented by an n×n array of pixel values p(x,y) between 0 and 100,000 on the square $0 \leq x, y \leq 1$. DP15 includes the following stages a.–f.:

a. Subsystem 30 sets $x_1, y_1 = 0$, $x_{10}, y_{10} = 1$, and selects: two sets of 8 ordered, random numbers with $0 < x_i, y_i < 1$; 100 random values $0 \leq v_{i,j} \leq 50,000$; and, 4 pairs $(a_i, b_i)$ of positive, random numbers with $a_1 = \min(a_i)$, $a_4 = \max(a_i)$, $b_1 = \min(b_i)$, $b_4 = \max(b_i)$.

b. Subsystem 30 establishes the bi-cubic spline s(x,y) so that $s(x_i, y_i) = v_{ij}$.

c. Subsystem 30 determines the linear change of coordinates from (x,y) to (u,v) that maps the unit square into the rectangle with vertices $(a_i, b_i)$.

d. Subsystem 30 sends p(u(x,y), v(x,y))+s(u(x,y), v(x,y)) as disguised arguments DA to computing center 50 to perform an edge detection computation.

e. Computing center 50 generates the disguised result DR as an image e(u,v) showing the edges and returns e(u,v) to subsystem 30.

f. Subsystem 30 computes e(x(u,v), y(u,v)) to obtain actual answer SA, the desired edges.

EXAMPLE SIXTEEN

For example sixteen, secure outsourcing of template matching utilized for image analysis is provided by disguise procedure DP16. For an N×N image I and a smaller n×n image object P, consider the computation of an (N−n+1)×(N−n+1) score matrix $C_{I,P}$ of the form given by expression (50) as follows:

$$G_{I,P}(i,j) = \sum_{k=0}^{n-1}\sum_{k'=0}^{n-1} f(I(i+k, j+k'), P((k, k')), \quad (50)$$

$$0 \leq i, j \leq N - n,$$

for some function f. Score matrices are often used in image analysis, specifically in template matching, when one is trying to determine whether (and where) an object occurs in an image. A small $C_{I,P}(i,j)$ indicates an approximate occurrence of the image object P in the image I (a zero indicates an exact occurrence). Frequent choices for the function f are $f(x,y) = (x-y)^2$ and $f(x,y) = |x-y|$.

When the function $f(x,y) = (x-y)^2$ is selected, DP16 proceeds with stages a.–e. as follows:

a. Subsystem 30 selects a random N×N matrix S1, and a random n×n matrix S2; and generates five positive random numbers α, β, γ, β', γ' such that $(\beta+\alpha\gamma)(\beta'+\alpha\gamma')(\gamma'\beta-\gamma\beta') \neq 0$.

b. Subsystem 30 computes six matrices: αI+S1, αP+S2, βI−γS1, βP−γS2, β'I−γ'S1, β'P−γ'S2, that serve as disguised arguments DA.

c. Subsystem 30 outsources the computation of three score matrices $C_{x,y}$, to computing center 50; where there is one score matrix for each pair X,Y of the matrices received.

d. Computing center 50 calculates the matrices and returns them to subsystem 30 as defined by the following expressions (51)–(53):

$$W = C_{(\alpha I+S1),(\alpha P+S2)} \quad (51)$$

$$U = C_{(\beta I-\gamma S1)(\beta P-\gamma S2)} \quad (52)$$

$$U' = C_{(\beta'I-\gamma'S1)(\beta'P-\gamma'S2)} \quad (53)$$

e. Subsystem 30 computes the matrices V and V' from W, U, and U'(the disguised results DR) as returned by computing center 50. The determination of matrices V and V' are in accordance with expressions (54)–(55) as follows:

$$V = (\beta+\alpha\gamma)^{-1}(\alpha U + \beta\gamma W); \text{ and} \quad (54)$$

$$V' = (\beta'+\alpha\gamma')^{-1}(\alpha U' + \beta'\gamma' W). \quad (55)$$

Subsystem 30 computes $\alpha^{-1}(\gamma'\beta-\gamma\beta')^{-1}(\beta'V-\gamma V')$ from V and V' which equals $C_{I,P}$.

When the function $f(x,y) = |x-y|$ is selected, DP16 proceeds with a two-dimensional version of the convolution disguise procedure, DP12; where A is defined as an alphabet, i.e., the set of symbols that appear in I or P; and for every symbol $x \in A$, DP16 proceeds with the following stages a.–h.:

a. Subsystem 30 replaces, in I, every symbol other than x by 0 (every x in I stays the same); where $I_x$ is designated the resulting image.

b. Subsystem 30 replaces every symbol that is $\leq x$ by 1 in P, and replaces every other symbol by 0; where $P_x$ is designated as the resulting image. $P_x$ is augmented into an N×N matrix $\Pi_x$ by padding it with zeroes which serves a first group of the disguised arguments DA.

c. Subsystem 30 outsources the computation of the score matrix according to the following expression (56) to computing center 50:

$$D_x(i, j) = \sum_{k=0}^{n-1} \sum_{k'}^{n-1} I_x(i+k, j+k') \prod_x (k, k'), 0 \le i, j \le N - n, \quad (56)$$

Expression (55) is a form of 2-dimensional convolution that can be outsourced using DP12.

d. Subsystem 30 replaces, in P, every symbol other than x by 0 (every x in P stays the same); where $P_x'$ is designated as the resulting image. $P_x'$ is augmented into an N×N matrix $\Pi_x'$ by padding it with zeroes which serves as second group of the disguised arguments (DA).

e. Subsystem 30 replaces every symbol that is <x by 1 in I, and every other symbol by 0; where $I_x'$ is designated the resulting image.

f. Subsystem 30 outsources the computation of the score matrix according to the following expression (57) to computing center 50:

$$D_x'(i, j) = \sum_{k=0}^{n-1} \sum_{k'}^{n-1} I_x'(i+k, j+k') \prod_x (k, k'), 0 \le i, j \le N - n. \quad (57)$$

Expression (56) is a form of 2-dimensional convolution that can be outsourced using DP12.

g. Computing center 50 returns the computations corresponding to expressions (56) and (57) (the disguised results DR) to subsystem 30.

h. Subsystem 30 computes the actual answer SA in accordance with expression (58) as follows:

$$c_{I,P} = \sum_{x \in A} (D_x + D_x') \quad (58)$$

EXAMPLE SEVENTEEN

In example seventeen, a secure outsourcing technique for sorting a sequence of numbers $E=(e_1, \ldots, e_n)$ is provided as disguise procedure DP17. DP17 proceeds with stages a.–f. as follows:

a. Subsystem 30 selects a strictly increasing function $f: E \to R$, such as $f(x)=\alpha+\beta(x+\gamma)^3$; where $\beta>0$. For this function f(x), subsystem 30 selects $\alpha$, $\beta$, and $\gamma$ in accordance with $\beta>0$.

b. Subsystem 30 generates a random sorted sequence $\Lambda=\{\lambda_1, \ldots \lambda_l\}$ of l numbers by randomly "walking" on the real line from MIN to MAX where MIN is smaller than the smallest number in E and MAX is larger than the largest number in E. Letting $\Delta=(MAX-MIN)/n$, the random walking is implemented by subsystem 30 as follows: (i) randomly generate $\lambda_1$ from a uniform distribution in [MIN, MIN+2$\Delta$]; (ii) randomly generate $\lambda_2$ from a uniform distribution in [$\lambda_1$, $\lambda_1$+2$\Delta$]; and continue in the same way until MAX is exceeded, which provides a total number of elements l. It may be observed that $\Lambda$ is sorted by the construction such that the expected value for the increment is $\Lambda$.

Correspondingly, the expected value for l is given by: (MAX-MIN)/$\Delta$=n.

c. Subsystem 30 computes the sequences E'=f(E) and $\Lambda'$=f($\Lambda$); where f(E) is the sequence obtained from E by replacing every element $e_i$ by f($e_i$), and concatenates the sequence $\Lambda'$ to E', obtaining W=E'∪$\Lambda'$.

d. Subsystem 30 randomly permutes W, the disguised arguments DA, before outsourcing to computing center 50.

e. Computing center 50 returns the disguised arguments DA as sorted result W'.

f. Subsystem 30 removes $\Lambda'$ from W' to produce the sorted sequence E', and computes E=$f^{-1}$(E'), the actual answer SA.

The value n may be revealed by this approach, because the number of items sent to the agent has expected value 2n. To provide greater security, n may be modified by letting $\Delta$=(MAX-MIN)/m where m is a number independent of n. Therefore the size of the outsourced sequence is m+n, which hides the size of problem through expansion.

EXAMPLE EIGHTEEN

In example 18, secure outsourcing of a text string pattern matching computation is provided by disguise procedure DP18. For DP18, T is a text string of length N, P is a pattern of length n (n$\le$N), and both are over alphabet A. DP18 is based on establishing a score vector $C_{T,P}$ such that $C_{T,P}(i)$ is the number of positions at which the symbols of pattern P equal their corresponding symbols of text string T when the pattern P is positioned under the substring of T that begins at position i of T, such that it is in accordance with the following expression (59):

$$\sum_{k=0}^{n-1} \delta_{T(k+i),P(i)} \quad (59)$$

where $\delta_{x,y}$ equals one if x=y and zero otherwise.

DP18 performs the following stages a.–d. for every symbol x $\in$ A:

a. Subsystem 30 replaces, in both T and P, every symbol other than x by 0, and every x by 1; and lets $T_x$ and $P_x$ be the resulting text and pattern, respectively. $P_x$ is augmented into a length N string $\Pi_x$ by padding it with zeros.

b. Subsystem 30 outsources to computing center 50 the computation of expression (60) as follows:

$$D_x(i) = \sum_{k=0}^{n-1} [[I_x]]T_x(i+k) \prod_x (k) \quad 0 \le i \le N - n. \quad (60)$$

The terms of expression (60) (disguised arguments DA) define a form of convolution that may be securely outsourced using DP12.

c. Computing center 50 returns disguised result DR, the expression (60) computation, to subsystem 30.

d. Subsystem 30 determines the actual answer SA, the score matrix $C_{T,P}$ as: $\Sigma_{x \in A} D_x$.

It should be appreciated that examples 1–18 are but a few of the forms of the embodiments of the present invention that may be utilized to provide secure outsourcing of one or more computations. Indeed, the stages, operations and techniques of these examples may be rearranged, combined, separated, deleted, altered, and added to other stages, operations, or techniques as would occur to those skilled in the art.

Further, in one alternative embodiment of the present invention, a system dedicated to the performance of only a single type of disguise procedure is utilized. In another alternative, different types of outsourced computations may be accommodated by a single disguise procedure or protocol. It should be appreciated that classification of the outsourced computation type for these alternative embodiments is optional. Indeed, even when selection of a disguise procedure is based on outsourced computation type, computation classification with one or more programs or computers is not needed; where, for example, an operator selects an appropriate disguise procedure for a given outsourced computation. In still other embodiments, classification may be partially operator-based or fully performed through the execution of one or more programs or routines.

Also, it should be appreciated that multiple agents A may be utilized to perform different parts of a given outsourced computation. Moreover, outsourced computation results may be received by a different computer than the sending computer. For this example, the different computers of customer C may exchange information desired to recover actual answer SA. In still other embodiments, multiple sites or computers may be utilized to prepare the disguised arguments DA and/or receive the disguised result DR.

Also, while both disguised arguments DA and disguised result DR are preferred, in other embodiments, it may be acceptable to reveal at least some of the actual arguments with only the result being disguised or to receive the actual answer with only the arguments being disguised. Further, while the term "arguments" has been used in the plural, it should be appreciated that the present invention includes embodiments that have only one argument. Correspondingly, while disguised result DR and actual answer SA have been used in the singular, it should be appreciated that the disguised result and/or actual answer may refer to a plurality.

Yet another embodiment of the present invention includes: determining one or more arguments to be outsourced; disguising the arguments by performing a local computation with a first computer; sending the disguised arguments to a second computer to perform the outsourced computation; and receiving a result of the outsourced computation.

Still another embodiment of the present invention includes a computer, an output device, and an input device. The computer is uniquely programmed to determine a group of disguised arguments from a set of actual arguments. The disguised arguments hide one or more characteristics of the actual arguments. The disguised arguments are output by the output device for remote performance of the outsourced computation. The input device receives the result of the outsourced computation performed with the disguised arguments.

A further embodiment of the present invention includes operating a first computer in accordance with one or more instructions to perform an outsourced mathematical operation. The first computer having received a number of disguised arguments that hide a group of actual arguments for the outsourced mathematical operation. The outsourced mathematical operation is performed on the disguised arguments with the first computer, and the result of the outsourced mathematical operation is output by the first computer.

In another embodiment, a system includes an input device to receive a plurality of disguised arguments that hide at least one characteristic of each of a number of actual arguments. The system also includes a computer responsive to the input device to perform an outsourced computation with the disguised arguments and provide a result of the outsourced computation. The system further comprises an output device to output the result for conversion to an actual answer corresponding to the actual arguments.

Still a further embodiment includes a computer readable medium that defines computer programming instructions to hide a group of actual arguments for a computation to be outsourced. The instructions provide for the generation of a group of disguised arguments corresponding to the actual arguments. The disguised argument are generated to provide a disguised result when provided for the computation. An actual answer is recoverable from the disguised result in accordance with the instructions. The actual answer corresponds to the results returned by the computation when the computation is provided the actual arguments.

All publications, patents, and patent applications cited in this specification are herein incorporated by reference as if each individual publication, patent, or patent application were specifically and individually indicated to be incorporated by reference and set forth in its entirety herein. While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the invention defined by following claims are desired to be protected.

What is claimed is:

1. A method comprising:
   determining a set of arguments for an outsourced computation;
   classifying, with a first computer, said outsourced computation into at least one computation type, said at least one computation type being selected from the group consisting of quadrature computations, image edge detection computations, convolution computations, character string pattern matching computations, sorting computations, and computations for solving one or more differential equations;
   selecting, with said first computer, one or more disguising operations from a predetermined set of disguising operations based on said classifying;
   performing said one or more selected disguising operations on said actual arguments with said first computer to provide disguised arguments;
   outputting said disguised arguments from said first computer for performance of said outsourced computation; and
   receiving a result of said outsourced computation performed with said disguised arguments.

2. The method of claim 1, further comprising computing an actual answer from said result after said receiving.

3. The method of claim 1, further comprising:
   receiving said disguised arguments at a second computer remotely located relative to said first computer;
   performing said outsourced computation with said second computer; and
   sending said result from said second computer to said first computer, said result being in a disguised form relative to an answer obtained by submitting said actual arguments to said outsourced computation.

4. The method of claim 1, wherein said step of performing said one or more selected disguising operations comprises the step of generating a plurality of pseudorandom numbers, each of said plurality of pseudorandom numbers being generated by one of a number of pseudorandom number generation techniques, said techniques each comprising a different distribution parameter.

5. The method of claim 4, wherein said step of performing said one or more selected disguising operations comprises defining a number of disguise functions with one or more of said pseudorandom numbers.

6. The method of claim 1, wherein said step of performing said one or more selected disguising operations comprises modifying a linear operator.

7. The method of claim 1, wherein said step of performing said one or more selected disguising operations comprises altering a dimension corresponding to said actual arguments to provide said disguised arguments.

8. The method of claim 7, wherein said altering comprises expanding said dimension.

9. The method of claim 1, wherein said step of performing said one or more selected disguising operations comprises performing a function substitution in accordance with at least one mathematical identity.

10. The method of claim 1, wherein said preparing comprises performing a function substitution in accordance with at least one expansion of unity.

11. A system comprising:
a computer operable to define a set of actual arguments for an outsourced computation, said computer being programmed to classify said computation into at least one computation type, said at least one computation type being selected from the group consisting of quadrature computations, image edge detection computations, convolution computations, character string pattern matching computations, sorting computations, and computations for solving one or more differential equations, said computer being programmed to determine a group of disguised arguments from said set of actual arguments, said disguised arguments hiding one or more characteristics of said set of actual arguments;
an output device responsive to said computer to output said disguised arguments for remote performance of said outsourced computation; and
an input device to receive a result of said outsourced computation performed with said disguised arguments, wherein said computer is responsive to said input device to determine a desired answer from said result.

12. The system of claim 11, further comprising a computing center, said computing center being programmed to perform said outsourced computation with said disguised arguments.

13. The system of claim 11 wherein said computer includes a memory, a library of disguise operations being stored in said memory, said computer programming referencing said library to generate said disguised arguments.

14. The system of claim 13, wherein said disguise operations correspond to at least one of the group consisting of random object generation, argument dimension modification, mathematical identity substitution, and disguise function generation.

15. The system of claim 11, wherein said computer includes instructions to generate a cubic spline to provide a disguise for said actual arguments.

16. An apparatus, comprising: a computer readable medium, said medium defining computer programming instructions to hide a group of actual arguments for a computation to be outsourced, said programming instructions being operable to classify said computation into at least one computation type, said at least one computation type being selected from the group consisting of quadrature computations image edge detection computations, convolution computations, character string pattern matching computations, sorting computations, and computations for solving one or more differential equations, said programming instructions being operable to generate a group of disguised arguments corresponding to said actual arguments, said disguised arguments being generated to produce a disguised result from said computation, an actual answer being recoverable from said disguised result in accordance with said programming instructions, said actual answer being returned by said computation when said computation is provided said actual arguments.

17. The apparatus of claim 16, further comprising a computer responsive to said programming instructions.

18. The apparatus of claim 16, wherein said programming instructions define a routine to generate a cubic spline to provide at least one disguise function.

19. The apparatus of claim 16, wherein said programming instructions define a routine to provide a random pseudorandom function space to provide one or more disguise functions.

20. A system comprising:
a computer operable to define a set of actual arguments for an outsourced computation, said computer being programmed to determine a group of disguised arguments from said set of actual arguments, said computer comprising instructions to generate a cubic spline to provide a disguise for said actual arguments, said disguised arguments hiding one or more characteristics of said set of actual arguments;
an output device responsive to said computer to output said disguised arguments for remote performance of said outsourced computation;
an input device to receive a result of said outsourced computation performed with said disguised arguments; and
wherein said computer is responsive to said input device to determine a desired answer from said result.

21. An apparatus comprising:
a computer readable medium, said medium comprising computer programming instructions to hide a group of actual arguments for a computation to be outsourced, said programming instructions being operable to generate a group of disguised arguments corresponding to said actual arguments, said programming instructions comprising a routine to generate a cubic spline to provide at least one disguise function, said disguised arguments being generated to provide a disguised result when provided for said computation, an actual answer being recoverable from said disguised result in accordance with said instructions, said actual answer being returned by said computation when said computation is provided said actual arguments.

22. A method for outsourcing a matrix multiplication computation from a first computer to a second computer, wherein the contents of a matrix are disguised prior to delivery of the matrix to the second computer for the matrix multiplication computation thereby hindering discovery of the contents of the matrix by the second computer and unauthorized parties, the method comprising the steps of:
providing, in a memory of a first computer, a first actual matrix M1 comprising a first plurality of actual arguments, and a second actual matrix M2 comprising a second plurality of actual arguments, wherein a multiplicative product of said first actual matrix M1 and said second actual matrix M2 is desired;

preparing, in said memory of said first computer, at least two disguising matrices, each said disguising matrix being a sparse matrix comprising at least one non-zero disguising argument, wherein each said at least one non-zero disguising argument comprises a pseudorandom number;

disguising said first plurality of actual arguments by computing, with said first computer, a first disguised matrix X using said first actual matrix M1 and at least one said disguising matrix, said first disguised matrix X comprising a first plurality of disguised arguments; and disguising said second plurality of actual arguments by computing, with said first computer, a second disguised matrix Y using said second actual matrix M2 and at least one said disguising matrix, said second disguised matrix Y comprising a second plurality of disguised arguments.

23. The method of claim 22, further comprising the steps of:

outputting said first plurality of disguised arguments and said second plurality of disguised arguments from said first computer for performance of a matrix multiplication computation with said first plurality of disguised arguments and said second plurality of disguised arguments as inputs to said matrix multiplication computation; and receiving, with said first computer, a result of said matrix multiplication computation.

24. The method of claim 23, further comprising, after the receiving step, the step of:

computing an actual answer from said result, said actual answer comprising said multiplicative product of said first actual matrix M1 and said second actual matrix M2.

25. The method of claim 23, further comprising the steps of:

receiving said first plurality of disguised arguments and said second plurality of disguised arguments at a second computer;

performing said matrix multiplication computation with said second computer; and sending said result from said second computer to said first computer, said result being in a disguised form relative to an answer that would have been obtained by submitting said first plurality of actual arguments and said second plurality of actual arguments to said second computer.

26. The method of claim 22, wherein said first actual matrix M1 is a non-square matrix.

27. The method of claim 22, wherein said second actual matrix M2 is a non-square matrix.

28. The method of claim 22, further comprising, before the step of disgusting said first plurality of actual arguments, the step of:

changing a dimension of said first actual matrix M1.

29. The method of claim 22, further comprising, before the step of disguising said second plurality of actual arguments, the step of:

changing a dimension of said second actual matrix M2.

30. The method of claim 22, further comprising the steps of:

preparing, in said memory of said first computer, a first matrix $S_1$ comprising a first plurality of pseudorandom arguments, and a second matrix $S2$ comprising a second plurality of pseudorandom arguments;

generating, with said first computer, a first pseudorandom number $\beta$, a second pseudorandom number $\gamma$, a third pseudorandom number $\beta'$, and a fourth pseudorandom number $\gamma'$;

computing, with a second computer, matrices W, U, and U' as follows:

$$W=(X+S_1)(Y+S_2),$$

$$U=(\beta X-\gamma S_1)(\beta Y-\gamma S_2), \text{ and}$$

$$U'=(\beta'X-\gamma'S_1)(\beta Y-\gamma'S_2);$$

computing, with said first computer, matrices V and V' as follows:

$$V=(\beta+\gamma)^{-1}(U+\beta\gamma W), \text{ and}$$

$$V'(\beta'+\gamma')^{-1}(U'+\beta'\gamma'W);$$

computing, with said second computer, a matrix Z as follows:

$$Z=(\gamma'\beta-\gamma\beta')^{-1}(\gamma'V-\gamma V'); \text{ and}$$

deriving, with said first computer, said multiplicative product of said first actual matrix M1 and said second actual matrix M2 from said matrix Z.

31. The method of claim 30, wherein said first actual matrix M1 is a non-square matrix.

32. The method of claim 30, wherein said second actual matrix M2 is a non-square matrix.

33. The method of claim 30, further comprising, before the step of disguising said first plurality of actual arguments, the step of:

changing a dimension of said first actual matrix M1.

34. The method of claim 30, further comprising, before the step of disguising said second plurality of actual arguments, the step of:

changing a dimension of said second actual matrix M2.

35. A method for outsourcing a matrix inversion computation from a first computer to a second computer, wherein the contents of a matrix are disguised prior to delivery of the matrix to the second computer for the matrix inversion computation thereby hindering discovery of the contents of the matrix by the second computer and unauthorized parties, the method comprising the steps of:

(a) providing, in a memory of a first computer, a first actual matrix M comprising a first plurality of actual arguments, wherein an inverse of said first actual matrix M is desired;

(b) providing, in said memory of said first computer, a matrix S comprising a plurality of pseudorandom arguments;

(c) generating, with said first computer, a first disguising matrix P1 and a second disguising matrix P2, wherein each said disguising matrix is a sparse matrix comprising at least one non-zero disguising argument, and wherein each said at least one non-zero disguising argument comprises a pseudorandom number;

(d) disguising said first plurality of actual arguments by computing, with said first computer, a matrix Q as follows:

$$Q=P1*M*S*P2^{-1},$$

said matrix Q comprising a first plurality of disguised arguments;

(e) transmitting said matrix Q to a second computer; and (f) determining, with said second computer, whether said matrix Q is invertible.

36. The method of claim 35, wherein said matrix Q is determined to be invertible, the method further comprising the steps of:

(g) inverting, with said second computer, said matrix Q to create an inverse matrix $Q^{-1}$;

(h) generating with said first computer, a third disguising matrix P3, a fourth disguising matrix P4, and a fifth disguising matrix P5, wherein each said disguising matrix is a sparse matrix comprising at least one non-zero disguising argument, and wherein each said at least one non-zero disguising argument comprises a pseudorandom number;

(i) computing, with said first computer, a matrix T as follows:

$$T = P4 * P2^{-1} * Q^{-1} * P1 * P5^{-1};$$

(j) computing, with said first computer, a matrix R as follows:

$$R = P3 * S * P4^{-1};$$

(k) computing, with said second computer, a matrix Z as follows:

$$Z = R * T;\ \text{and}$$

(l) deriving, with said first computer, said inverse of said first actual matrix M from said matrix Z.

37. The method of claim 35, wherein said matrix Q is determined not to be invertible, the method further comprising the steps of:

(g) computing, with said first computer, a matrix S' as follows: $S' = S_1 * S * S_2$, where $S_1$ and $S_2$ are matrices known to be invertible;

(h) determining, with said second computer, whether said matrix S' is invertible; and (i) if said matrix S' is determined not to be invertible, repeating steps (b)–(f).

38. The method of claim 35, further comprising, before the step of providing said matrix S, the step of:

changing a dimension of said first actual matrix M.

39. A method for outsourcing the computation of a solution vector for a system of linear equations of the form Mx=b from a first computer to a second computer, wherein the system of linear equations is disguised prior to delivery of the system of linear equations to the second computer for computation of the solution vector, thereby hindering discovery of the system of linear equations by the second computer and unauthorized parties, the method comprising the steps of:

providing a matrix M, said matrix M having n rows and n columns and comprising a first plurality of actual arguments, wherein n is a positive integer;

providing a vector b, said vector b having n elements and comprising a second plurality of actual arguments;

generating, with a first computer, a matrix B having dimensions identical to said matrix M, said matrix B comprising a plurality of pseudorandom arguments;

disguising said second plurality of actual arguments by replacing, in a memory of said first computer, a row of said matrix B with said vector b;

preparing, in said memory of said first computer, at least two disguising matrices, each said disguising matrix being a sparse matrix comprising at least one non-zero disguising argument, wherein each said at least one non-zero disguising argument comprises a pseudorandom number;

disguising said first plurality of actual arguments by computing, with said first computer, a matrix C' using said matrix M and at least two of said at least two disguising matrices, said matrix C' comprising a first plurality of disguised arguments;

disguising said second plurality of actual arguments by computing, with said first computer, a matrix G' using said matrix B and at least two of said at least two disguising matrices; and transmitting said matrix C' and said matrix G' to a second computer.

40. The method of claim 39, further comprising the steps of:

computing, with said second computer, a matrix U as follows: $U = C'^{-1} * G'$;

computing, with said first computer, a matrix X using said matrix U and at least two of said at least two disguising matrices; and deriving, with said first computer, a solution vector x from said matrix X, said solution vector x satisfying the following: Mx=b.

41. A method for outsourcing the computation of a solution vector for a system of linear equations of the form Mx=b from a first computer to a second computer, wherein the system of linear equations is disguised prior to delivery of the system of linear equations to the second computer for computation of the solution vector, thereby hindering discovery of the system of linear equations by the second computer and unauthorized parties, the method comprising the steps of:

providing a matrix M, said matrix M having n rows and n columns and comprising a first plurality of actual arguments, wherein n is a positive integer;

providing a vector b, said vector b having n elements and comprising a second plurality of actual arguments;

disguising said first plurality of actual arguments by embedding, in a memory of a first computer, said matrix M in a larger matrix M';

disguising said second plurality of actual arguments by embedding, in said memory of said first computer, said vector b in a larger vector b';

computing a solution vector x' that satisfies the equation M'x'=b', wherein said computation of said solution vector x' is allocated between said first computer and a second computer with each of said first computer and said second computer performing at least a portion of said computation of said solution vector x'; and deriving, with said first computer, a solution vector x from said solution vector x', said solution vector x satisfying the equation Mx=b.

42. A method for outsourcing the computation of an estimate for the solution of a quadrature computation of the form $$\int_a^b f(x)dx,$$

from a first computer to a second computer, wherein the estimate to be computed must conform to a predetermined level of accuracy, and wherein function f(x) is disguised to hinder discovery of function f(x) by the second computer and unauthorized parties, the method comprising the steps of:

creating, in a memory of a first computer, at least seven numbers $y_i$, wherein i is an integer index variable having a property of $1 \leq i \leq max$, wherein $y_1=a$ and $y_{max}=b$, and wherein said other numbers $y_i$ satisfy the following properties:

$a < y_i < b$, and $y_{i-1} < y_i$;

creating, in said memory of said first computer, a number of values $v_1$, wherein i is an integer index variable having a property of $1 \leq i \leq max$, wherein there are the same number of values $v_i$ as numbers $y_i$, and wherein said values $v_i$ satisfy the following properties:

$v_{i-1} < v_i$, and min $|f(x)| \approx v_1 \leq v_{max} \approx max|f(x)|$, wherein the operations min $|f(x)|$ and max $|f(x)|$ return the minimum and maximum absolute value of function f(x), respectively;

creating, in said memory of said first computer, a cubic spline g(y) with breakpoints comprising said numbers $y_i$ such that $g(y_i)=v_i$;

integrating, with said first computer, cubic spline g(y) from a to b to obtain a value $I_1$;

creating disguised function h(x), said disguised function h(x) being created using said function f(x) and said cubic spline g(y):

transmitting said disguised function h(x) and a designation of said predetermined level of accuracy to a second computer;

computing, with said second computer, a value $I_2$ using said disguised function h(x) and said designation of said predetermined level of accuracy; and computing, with said first computer, said estimate by subtracting said value $I_1$ from said $I_2$.

43. A method for outsourcing a convolution computation of two vectors from a first computer to a second computer, wherein the contents of the vectors are disguised prior to delivery of the vectors to the second computer for the convolution computation, thereby hindering discovery of the contents of the vectors by the second computer and unauthorized parties, the method comprising the steps of:

providing, in a memory of a first computer, a first vector $M_1$ and a second vector $M_2$, said first vector $M_1$ and said second vector $M_2$ being of equivalent size;

creating, in said memory of said first computer, a first pseudorandom vector $S_1$ and a second pseudorandom vector $S_2$, said first pseudorandom vector $S_1$ and second pseudorandom vector $S_2$ being the same size as said first vector $M_1$, and said second vector $M_2$;

generating, with said first computer, a first pseudorandom number $\alpha$, a second pseudorandom number $\beta$, a third pseudorandom number $\gamma$, a fourth pseudorandom number $\beta'$, and a fifth pseudorandom number $\gamma'$; and disguising said first vector $M_1$ and said second vector $M_2$ by generating vector D, vector E, vector F, vector G, vector H, and vector I as follows: $D=\alpha M_1$, $E=\alpha M_2$, $F=\beta M_1$, $G=\beta M_2$, $H=\beta' M_1$, and $I=\beta' M_2$.

44. The method of claim 43, further comprising, before the step of creating said first pseudorandom vector $S_1$ and said second pseudorandom vector $S_2$, the step of:

altering, in said memory of said first computer, said size of said first vector $M_1$ and said second vector $M_2$.

45. The method of claim 43, further comprising the steps of:

computing, with a second computer, convolutions W, U, and U' as follows:

$W=(D_-S_1) \otimes (E_+S_2)$, $U=(F_-\gamma S_1) \otimes (G_-\gamma S_2)$, and $U'=(H_-\gamma' S_1) \otimes (I_-\gamma' S_2)$;

computing, with said first computer, vectors V and V' as follows:

$V=(\beta+\alpha\gamma)^-(\alpha U+\beta\gamma W)$, and $V'=(\beta'+\alpha\beta')^{-1}(\alpha U'+\beta'\gamma' W)$; and deriving, with said first computer, a convolution of said first vector $M_1$ and said second vector $M_2$ utilizing said vectors V and V'.

46. A method for outsourcing the computation of a solution to a linear differential equation $Ly=F(x,y)$ of order N from a first computer to a second computer, wherein N is a positive integer, the linear differential equation having boundary conditions $y(x_i)=y_i$, wherein i is an integer index variable and $0 \leq i \leq N$, wherein the linear differential equation and boundary conditions are disguised prior to delivery of the linear differential equation and boundary conditions to the second computer for the convolution computation, thereby hindering discovery of the linear differential equation and boundary conditions by the second computer and unauthorized parties, the method comprising the steps of:

creating, in a memory of a first computer, a cubic spline g(x) and a function $u(x)=Lg(x)$, wherein Lg(x) is a linear differential equation of order N;

disguising said linear differential equation Ly by adding said function u(x) thereto;

disguising said boundary conditions $y(x_i)$ by adding function $u(x_i)$ thereto;

transmitting said disguised linear differential equation Ly and said disguised boundary conditions $v(x_i)$ to a second computer;

deriving, with said second computer, a solution function z(x) from said disguised linear differential equation Ly and said disguised boundary conditions $y(x_i)$;

deriving, with said first computer, a solution to said linear differential equation Ly from said solution function z(x).

47. A method for disguising a symbolic mathematical expression in a software program, the method comprising the step of:

automatically applying one or more transformation techniques to said symbolic mathematical expression, said one or more transformation techniques selected from the group consisting of disguising constants in said symbolic mathematical expression and replacing variable names in said symbolic mathematical expression.

48. A method for disguising a symbolic mathematical expression in a software program, the method comprising the step of:

automatically applying one or more transformation techniques to said symbolic mathematical expression, said one or more transformation techniques selected from the group consisting of applying at least one mathematical identity function to said symbolic mathematical expression and applying at least one expansion of unity to said symbolic mathematical expression.

49. A method for analyzing a digital image wherein a computation for detecting edges of the digital image is outsourced from a first computer to a second computer, and wherein the digital image is disguised prior to delivery of the digital image to the second computer for the edge detection computation thereby hindering discovery of the digital image by the second computer and unauthorized parties, the method comprising the steps of:

providing a digital image, said digital image being represented by an n×n array of pixel values p(x,y) between 0 and N on a unit square $0 \leq x,y \leq 1$, wherein n and N are positive integers:

creating, in a memory of a first computer, at least ten ordered number pairs $x_i, y_i$, wherein i is an integer index variable having a property of $1 \leq i \leq max$, wherein $x_1, y_1=0$, wherein $x_{max}, y_{max}=1$, and wherein the remaining ordered number pairs $x_i, y_i$ satisfy the following properties:

$0 < x_i, y_i < 1$, and $x_{i-1}, y_{i-1} < x_i, y_i$;

creating, in said memory of said first computer, a plurality of pseudorandom values $v_{ij}$ such that $0 \leq v_{ij} \leq N/2$;

creating, in said memory of said first computer, four number pairs $a_k, b_k$, wherein k is an integer index variable having a property of $1 \leq k \leq 4$, each said number pair $a_k, b_k$ comprising positive pseudorandom numbers such that $a_1=\min(a_k)$, $a_4=\max(a_k)$, $b_1=\min(b_k)$, and $b_4=\max(b_k)$;

creating, in said memory of said first computer, a bi-cubic spline s(x,y), such that each $s(x_i,y_i)=v_{ij}$;

determining, with said first computer, a linear change of coordinates from (x,y) coordinates to (u,v) coordinates that maps said unit square into a rectangle with vertices $(a_k, b_k)$;

disguising said pixel values p(x,y) by converting, with said first computer, said pixel values p(x,y) to pixel values p(u,v);

disguising said bi-cubic spline s(x,y) by converting, with said first computer, said bi-cubic spline s(x,y) to a bi-cubic spline s(u,v); and transmitting said pixel values p(u,v) and said bi-cubic spline s(u,v) to a second computer.

50. The method of claim 49, further comprising the steps of:

computing, with said second computer, an image e(u,v) using said pixel values p(u,v) and said bi-cubic spline s(u,v); and computing, with said first computer, edges of said image e(u,v).

51. A method for analyzing a digital image wherein the desired outcome of the analysis is an approximation of whether a digital image object appears in a larger digital image, wherein a portion of the analysis is outsourced from a first computer to a second computer, and wherein the digital image object and the larger digital image are disguised prior to delivery of the digital image object and the larger digital image to the second computer for the analysis thereby hindering discovery of the image object and the larger image by the second computer and unauthorized parties, the method comprising the steps of:

providing an image I, said image I being represented by a matrix of size N×N, wherein N is a positive integer;

providing an image object P, said image object P being represented by matrix of size n×n, wherein n is a positive integer, and wherein n<N;

generating, with a first computer, a random matrix S1 of size N×N, and a random said matrix S1 comprising a plurality of pseudorandom arguments;

generating, with a first computer, a matrix S2 of size n×n, said matrix S2 comprising a plurality of pseudorandom arguments;

generating, with said first computer, first pseudorandom number α, second pseudorandom number β, third pseudorandom number γ, fourth pseudorandom number β', and fifth pseudorandom number γ';

disguising said image object P and said image I by computing, with said first computer, a set of disguised arguments comprising the following matrices:

$G=\alpha I+S1$, $H=\alpha P+S2$, $J=\beta I-\gamma S1$, $K=\beta P-\gamma S2$, $L=\beta' I-\gamma' S1$, and $M=\beta' P-\gamma' S2$; and transmitting said matrices G, H, J, K, L, and M to a second computer.

52. The method of claim 51, further comprising the steps of:

computing, with said second computer, matrices W, U, and U' as follows:

$$W = C_{G,H} = \sum_{k=0}^{n-1} \sum_{k'=0}^{n-1} f(G(i+k, j+k'), H(k,k')), 0 \leq i, j \leq N-n,$$

$$U = C_{J,K} = \sum_{k=0}^{n-1} \sum_{k'=0}^{n-1} f(J(i+k, j+k'), K(k,k')), 0 \leq i, j \leq N-n,$$

and $$U' = C_{L,M} = \sum_{k=0}^{n-1} \sum_{k'=0}^{n-1} f(L(i+k, j+k'), M(k,k')), 0 \leq i, j \leq N-n;$$

computing, with said first computer, matrices V and V' as follows:

$V=(\beta+\alpha\gamma)^{-1}(\alpha U+\beta\gamma W)$, and $V'=(\beta+\alpha\gamma)^{-1}(\alpha U'+\beta'\gamma' W)$; and deriving, with said first computer, said score matrix from said matrices V and V'.

53. The method of claim 51, further comprising the steps of:

computing, with said second computer, a first score matrix using said matrices G and H;

computing, with said second computer, a second score matrix using said matrices J and K;

computing, with said second computer, a third score matrix using said matrices L and M;

receiving said first score matrix, said second score matrix, and said third score matrix at said first computer; and deriving, with said first computer, a final score matrix using said first score matrix, said second score matrix, and said third score matrix, said final score matrix comprising an approximation of whether said image object P appears in said image I.

54. A method for outsourcing the sorting of a plurality of numbers from a first computer to a second computer, wherein the plurality of numbers is disguised prior to delivery of the plurality of numbers to the second computer thereby hindering discovery of the plurality of numbers by the second computer and unauthorized parties, the method comprising the steps of:

providing a set of n numbers E a plurality of n numbers $E=\{e_1, \ldots, e_n\}$, wherein n is a positive integer;

selecting, with a first computer, a strictly increasing function f( );

generating, with said first computer, a sorted sequence $\{\Lambda=\lambda_1, \ldots, \lambda_n\}$ of n pseudorandom numbers;

disguising said plurality of numbers E by computing, with said first computer, a plurality of numbers E'=f(E) and sequence $\Lambda'=f(\Lambda)$, where wherein f(E) is obtained from plurality of numbers E by replacing every element $e_i$ of plurality of numbers E with $f(e_i)$;

computing, with said first computer, set W; by concatenating said plurality of numbers E' and said sequence $\Lambda'$: and disguising set W by randomly permuting set W with said first computer.

55. The method of claim 54, further comprising the steps of:

sorting, with a second computer, said randomly permuted set W to derive sorted set W'; and deriving, with said first computer, sorted sequence E from sorted set W'.

56. A method for text string analysis wherein it is desired to determine whether a text pattern appears in a larger text string, wherein a portion of the analysis is outsourced from a first computer to a second computer, and wherein the text pattern and the text string are disguised prior to delivery of the text pattern and the text string to the second computer thereby hindering discovery of the text pattern and the text string by the second computer and unauthorized parties, the method comprising the steps of:

(a) providing a text string T of length N, wherein N is a positive integer, said text string T comprising N text symbols, and wherein P is;

(b) providing a text pattern P of length n, wherein n is a positive integer that is smaller than N, said text pattern P comprising n text symbols;

(c) providing an alphabet A, said alphabet A comprises the comprising a plurality of possible text symbols that could appear in said text string T or said text pattern P;

(d) selecting a text symbol from said alphabet A;

(e) generating disguised text string $T_x$ by replacing, with a first computer, each instance of said selected text symbol in said text string T with the number 1, and replacing each other text symbol in said text string T with the number 0;

(f) generating disguised text pattern $P_x$ by replacing, with a first computer, each instance of said selected text symbol in said text pattern P with the number 1, and replacing each other text symbol in text pattern P with the number 0; and (g) augmenting, with a first computer, said text pattern $P_x$ into a longer text string P' of length N by adding zeros thereto;

(h) transmitting said text string $T_x$ and said text string P' to a second computer.

57. The method of claim 56, further comprising the steps of:

(i) computing, with a second computer, a value $D_x$ as follows:

$$D_x(i) = \sum_{k=0}^{n-1} T_x(i+k)P'(k), 0 \le i \le N - n;$$

(j) repeating steps (d)–(i) until all text symbols from said alphabet A have been selected one time; and (k) computing, with said first computer, a score matrix using all said values $D_x$, said score matrix comprising an approximation of whether said text pattern P appears in said text string T.

58. A first computer for disguising the contents of a matrix prior to delivery of the matrix to a second computer for a matrix multiplication computation thereby hindering discovery of the matrix by the second computer and unauthorized parties, the computer comprising:

a memory;

computer circuitry configured to define a first actual matrix M1 in said memory, said first actual matrix M1 comprising a first plurality of actual arguments;

computer circuitry configured to define a second actual matrix M2 in said memory, said second actual matrix M2 comprising a second plurality of actual arguments;

computer circuitry configured to prepare at least two disguising matrices in said memory, each said disguising matrix being a sparse matrix comprising at least one non-zero disguising argument, wherein each said at least one non-zero disguising argument comprises a pseudorandom number;

computer circuitry configured to disguise said first plurality of actual arguments by computing a first disguised matrix X using said first actual matrix M1 and at least one said disguising matrix, said first disguised matrix X comprising a first plurality of disguised arguments; and computer circuitry configured to disguise said second plurality of actual arguments by computing a second disguised matrix Y using said second actual matrix M2 and at least one disguising matrix, said second disguised matrix Y comprising a second plurality of disguised arguments.

59. The computer of claim 58; further comprising:

computer circuitry configured to output said first plurality of disguised arguments and said second plurality of disguised arguments for performance of a matrix multiplication, computation by another computer, wherein said first plurality of disguised arguments and said second plurality of disguised arguments comprise inputs to said matrix multiplication computation;

computer circuitry configured to receive a result of said matrix multiplication computation from said other computer; and computer circuitry configured to compute an actual answer from said result, said actual answer comprising said product of said first actual matrix M1 and said second actual matrix M2.

60. The computer of claim 58, further comprising:

computer circuitry configured to prepare a first pseudorandom matrix $S_1$ comprising a first plurality of pseudorandom arguments, and to prepare a second pseudorandom matrix $S_2$ comprising a second plurality of pseudorandom arguments;

computer circuitry configured to generate a first pseudorandom number $\beta$, a second pseudorandom number $\gamma$, a third pseudorandom number $\beta'$, and a fourth pseudorandom number $\gamma'$;

computer circuitry configured to compute a first set of disguised arguments from the following matrix operations:

$(X+S_1)$, $(Y+S_2)$, $(\beta X - \gamma S_1)$, $(\beta Y - \gamma S_2)$, $(\beta' X - \gamma' S_1)$, and $(\beta' Y - \gamma' S_1)$, computer circuitry configured to output said first set of disguised arguments;

computer circuitry configured to receive a matrix U, a matrix U', and a matrix W computed from said first set of disguised arguments;

computer circuitry configured to compute a second set of disguised arguments comprising matrices V and V' as follows:

$V=(\beta+\gamma)^{-1}(U+\beta\gamma W)$, and $V'=(\beta'+\gamma')^{-1}(U'+\beta'\gamma'W)$;

computer circuitry configured to output said second set of disguised arguments;

computer circuitry configured to receive a matrix Z computed from said second set of disguised arguments; and computer circuitry configured to derive a multiplicative product of said first actual matrix M1 and said second actual matrix M2 from said matrix Z.

61. A computer for disguising a matrix prior to transmitting the matrix to another computer for a matrix inversion computation thereby hindering discovery of the matrix by the other computer and unauthorized parties, the computer comprising:

a memory;

computer circuitry configured to define a matrix M in said memory, said matrix M comprising a first plurality of actual arguments;

computer circuitry configured to prepare a pseudorandom matrix S, said pseudorandom matrix S comprising a plurality of pseudorandom arguments;

computer circuitry configured to generate a first disguising matrix P1 and a second disguising matrix P2, wherein each said disguising matrix is a sparse matrix comprising at least one non-zero disguising argument, wherein each said at least one non-zero disguising argument comprises a pseudorandom number; and computer circuitry configured to disguise said matrix M by computing a matrix Q as follows:

$Q=P1*M*S*P2^{-1}$.

62. The computer of claim 61, further comprising:

computer circuitry configured to receive an inverse matrix $Q^{-1}$ of said matrix Q;

computer circuitry configured to generate a third disguising matrix P3, a fourth disguising matrix P4, and a fifth disguising matrix P5, wherein each said disguising matrix is a sparse matrix comprising at least one non-zero disguising argument, wherein each said at least one non-zero disguising argument comprises a pseudorandom number;

computer circuitry configured to compute a matrix T as follows:

$T=P4*P2^{-1}*Q^{-1}*P1*P5^{-1}$ computer circuitry configured to compute, a matrix R as follows:

$R=P3*S*P4^{-1}$;

computer circuitry configured to output said matrices T and R;

computer circuitry configured to receive a matrix Z, said matrix Z being computed from said matrices T and R; and computer circuitry configured to derive an inverse of said matrix M from said matrix Z.

63. The computer of claim 61, further comprising:

computer circuitry configured to compute a matrix S' as follows: $S'=S_1*S*S_2$, wherein $S_1$ and $S_2$ are matrices known to be invertible; and computer circuitry configured to output said matrix S'.

64. A computer for use in the computation of a solution vector for a system of linear equations of the form Mx=b, the computer being able to disguise the system of linear equations prior to delivery of the system of linear equations to another computer for computation of the solution vector, thereby hindering discovery of the system of linear equations by the other computer and unauthorized parties, the computer comprising:

a memory;

computer circuitry configured to receive a matrix M and store said matrix M in said memory, said matrix M comprising n rows and n columns wherein n is a positive integer, said matrix M comprising a first plurality of actual arguments;

computer circuitry configured to receive a vector b and store said vector b in said memory, said vector b comprising n elements, said vector b comprising a second plurality of actual arguments;

computer circuitry configured to generate a matrix B having the same dimensions as matrix M and comprising a plurality of pseudorandom arguments;

computer circuitry configured to disguise said second plurality of actual arguments by replacing a row of said matrix B with said vector b;

computer circuitry configured to prepare at least two disguising matrices, each said disguising matrix being a sparse matrix comprising at least one non-zero disguising argument, wherein each said at least one non-zero disguising argument comprises a pseudorandom number;

computer circuitry configured to disguise said first plurality of actual arguments by computing a matrix C' using said matrix M and at least two of said at least two disguising matrices;

computer circuitry configured to disguise said second plurality of actual arguments by computing a matrix G' using said matrix B and at least two of said at least two disguising matrices;

computer circuitry configured to output said matrices C' and G';

computer circuitry configured to receive a matrix U, said a matrix U computed from said matrix G' and the inverse of said matrix C';

computer circuitry configured to compute a matrix X using said matrix U and at least two of said at least two disguising matrices; and computer circuitry configured to derive a solution vector x from said matrix X, said solution vector x satisfying the following: Mx=b.

65. A computer for use in the computation of a solution vector x for a system of linear equations of the form Mx=b, the computer being able to disguise the system of linear equations prior to delivery of the system of linear equations to another computer for computation of the solution vector, thereby hindering discovery of the system of linear equations by the other computer and unauthorized parties, the computer comprising:

a memory;

computer circuitry configured to receive a matrix M and store said matrix M in said memory, said matrix M comprising a first plurality of actual arguments;

computer circuitry configured to receive a vector b and store said vector b in said memory, said vector b comprising a second plurality of actual arguments;

computer circuitry configured to disguise said first plurality of actual arguments by embedding said matrix M in a matrix M', said matrix M' being larger than said matrix M;

computer circuitry configured to disguise said second plurality of actual arguments by embedding said vector b in a vector b', said vector b' being larger than said vector b;

computer circuitry configured to outsource to another computer at least a portion of the computation of a solution vector x' that satisfies equation M'x'=b'; and computer circuitry configured to derive a solution vector x from said solution vector x', said solution vector x satisfying the equation Mx=b.

66. A computer for use in disguising a function f(x) to hinder discovery of function f(x) by other computers or unauthorized parties, wherein the function f(x) is used in the computation of an estimate for the solution of a quadrature computation of the form $$\int_a^b f(x)dx,$$

and wherein the estimate to be computed must conform to a predetermined level of accuracy, the computer comprising:

a memory;

computer circuitry configured to receive a function f(x) and store said function f(x) in said memory;

computer circuitry configured to generate at least seven numbers $y_i$, wherein i is an integer index variable having a property of $1 \leq i \leq max$, wherein $y_1 = a$ and $y_{max} = b$, and wherein said other numbers $y_i$ satisfy the following properties:

$a < y_i < b$, and $y_{i-1} < y_i$;

computer circuitry configured to generate a quantity of values $v_i$, wherein i is an integer index variable having a property of $1 \leq i \leq max$, wherein there are the same quantity of said values $v_i$ as said numbers $y_i$, and wherein said values $v_i$ satisfy the following properties:

$v_{i-1} < v_i$, and min $|f(x)| \approx v_1 \leq v_{max} \approx$ max $|f(x)|$, wherein the operations min $|f(x)|$ and max $|f(x)|$ return the minimum and maximum absolute value of function f(x), respectively;

computer circuitry configured to generate a cubic spline g(y) with breakpoints comprising cubic spline said numbers $y_i$ such that $g(y_i) = v_i$;

computer circuitry configured to integrate said cubic spline g(y) from a to b to obtain a value $I_1$;

computer circuitry configured to create disguised function h(x), said disguised function h(x) being created using said function f(x) and said cubic spline g(y);

computer circuitry configured to output said disguised function h(x) and a designation of said predetermined level of accuracy;

computer circuitry configured to receive a value $I_2$ from another computer, wherein said value $I_2$ is computed using said disguised function h(x) and said designation of said predetermined level of accuracy; and computer circuitry configured to compute said estimate using said value $I_1$ and said value $I_2$.

67. A computer for use in disguising two vectors, wherein said vectors are to be used in a convolution computation, and wherein the contents of the vectors are disguised prior to delivery of the vectors to another computer for the convolution computation thereby hindering discovery of the contents of the vectors by the other computer and unauthorized parties, the computer comprising:

a memory;

computer circuitry configured to define a first vector $M_1$ and a second vector $M_2$ in said memory, said first vector $M_1$ and said second vector $M_2$ being of equivalent size;

computer circuitry configured to define a first pseudorandom vector $S_1$ and a second pseudorandom vector $S_2$, said first pseudorandom vector $S_1$ and second pseudorandom vector $S_2$ being the same size as said first vector $M_1$ and said second vector $M_2$;

computer circuitry configured to define a first pseudorandom number $\alpha$, a second pseudorandom number $\beta$, a third pseudorandom number $\gamma$, a fourth pseudorandom number $\beta'$, and a fifth pseudorandom number $\gamma'$;

computer circuitry configured to disguise said first vector $M_1$ and said second vector $M_2$ by generating vector D, vector E, vector F, vector G, vector H, and vector I as follows: $D = \alpha M_1$, $E = \alpha M_2$, $F = \beta M_1$, $G = \beta M_2$, $H = \beta' M_1$, and $I = \beta' M_2$;

computer circuitry configured to disguise said first pseudorandom vector $S_1$ and said second pseudorandom vector $S_2$ by generating vector J, vector K, vector L, and vector M as follows: $J = \gamma S_1$, $K = \gamma S_2$, $L = \gamma' S_1$, and $M = \gamma' S_2$;

computer circuitry configured to supply said vectors $S_1$, $S_2$, D, E, F, G, H, I, J, K, L, and M to another computer for the computation of a vector U, a vector U', and a vector W as follows:

$W = (D\_S_1) \otimes (E\_S_2)$, $U = (F\_J) \otimes (G\_K)$, and $U' = (H\_L) \otimes (I\_M)$;

computer circuitry configured to receive said vector U, said vector U', and said vector W;

computer circuitry configured to derive a convolution of said first vector $M_1$ and said second vector $M_2$ using said vector U, said vector U', said vector W.

68. A computer for use in disguising a linear differential equation prior to delivery of the linear differential equation to another computer where a solution to the linear differential equation will be solved, thereby hindering discovery of the linear differential equation by the other computer and unauthorized parties, the computer comprising:

a memory;

a linear differential equation Ly=F(x,y) of order N stored in said memory, wherein N is a positive integer, the linear differential equation having boundary conditions $y(x_i)=y_i$ stored in said memory, wherein i is an integer index variable and $0 \leq i < N$;

computer circuitry configured to define a cubic spline g(x) and a function u(x)=Lg(x), wherein Lg(x) is a linear differential equation of order N;

computer circuitry configured to disguise said linear differential equation Ly by adding said function u(x) thereto;

computer circuitry configured to disguise said boundary conditions $y(x_i)$ by adding function $u(x_i)$ thereto;

computer circuitry configured to transmit said disguised linear differential equation Ly and said disguised boundary conditions $y(x_i)$ to at least one other computer;

computer circuitry configured to receive a solution function z(x) from said at least one other computer, said solution function z(x) being derived from said disguised linear differential equation Ly and said disguised boundary conditions $v(x_i)$; and computer circuitry configured to derive a solution to said linear differential equation Ly from said solution function z(x).

69. A computer comprising:

a memory, said memory comprising a software program; and computer circuitry configured to automatically apply one or more transformation techniques to a symbolic mathematical expression in said software program, said one or more transformation techniques selected from the group consisting of disguising constants in said symbolic mathematical expression and replacing variable names in said symbolic mathematical expression.

70. A computer comprising:

a memory, said memory comprising a software program; and computer circuitry configured to automatically apply one or more transformation techniques to a symbolic mathematical expression in said software program, said one or more transformation techniques selected from the group consisting of applying at least one mathematical identity function to said symbolic mathematical expression and applying at least one expansion of unity to said symbolic mathematical expression.

71. A first computer for use in analyzing a digital image wherein a computation for detecting edges of digital image is to be outsourced to a second computer, and wherein the digital image is disguised prior to delivery of the digital image to the second computer for the edge detection computation thereby hindering discovery of the digital image by the second computer and unauthorized parties, the first computer comprising:

a memory, said memory comprising a digital image, wherein said digital image is represented in said memory by an n×n array of pixel values p(x,y) between 0 and N on a unit square $0 \leq x,y \leq 1$, wherein n and N are positive integers;

computer circuitry configured to define at least ten ordered number pairs $x_i,y_i$ in said memory, wherein i is an integer index variable having a property of $1 \leq i \leq max$, wherein $x_1,y_1=0$, wherein $x_{max},y_{max}=1$, and wherein the remaining ordered number pairs $x_i,y_i$ satisfy the following properties:

$0 < x_i, y_i < 1$, and $x_{i-1}, y_{i-1} < x_i, y_i$;

computer circuitry configured to define a plurality of pseudorandom values $v_{ij}$ such that $0 \leq v_{ij} \leq N/2$ in said memory;

computer circuitry configured to define four number pairs $a_k, b_k$ in said memory, wherein k is an integer index variable having a property of $1 \leq k \leq 4$, each said number pair $a_k, b_k$ comprising positive pseudorandom numbers such that $a_1=\min(a_k)$, $a_4=\max(a_k)$, $b_1=\min(b_k)$, and $b_4=\max(b_k)$;

computer circuitry configured to define a bi-cubic spline s(x,y) in said memory, such that $s(x_i,y_i)=v_{ij}$;

computer circuitry configured to determine a linear change of coordinates from (x,y) coordinates to (u,v) coordinates that maps said unit square into a rectangle with vertices $(a_k,b_k)$;

computer circuitry configured to disguise said pixel values p(x,y) by converting said pixel values p(x,y) to pixel values p(u,v);

computer circuitry configured to disguise said bi-cubic spline s(x,y) by converting said bi-cubic spline s(x,y) to a bi-cubic spline s(u,v);

computer circuitry configured to output said pixel values p(u,v) and said bi-cubic spline s(u,v) to another computer;

computer circuitry configured to receive an image e(u,v) computed using said pixel values p(u,v) and said bi-cubic spline s(u,v); and computer circuitry configured to derive edges of said image e(u,v).

72. A first computer for use in analyzing a digital image wherein the desired outcome of the analysis is an approximation of whether a digital image object appears in a larger digital image, wherein a portion of the analysis is outsourced from the first computer to a second computer, and wherein the image object and the larger image are disguised prior to delivery of the image object and the larger image to the second computer for the analysis thereby hindering discovery of the image object and the larger image by the second computer and unauthorized parties, the first computer comprising:

a memory, said memory comprising an image I, said image I being represented in said memory by a matrix of size N×N, wherein N is a positive integer;

an image object P in said memory, said image object P being represented by matrix of size n×n, wherein n is a positive integer, and wherein n<N;

computer circuitry configured to define matrix $S_1$ of size N×N, said matrix S1 comprising a plurality of pseudorandom arguments;

computer circuitry configured to define a matrix S2 of size n×n, said matrix S2 comprising a plurality of pseudorandom arguments;

computer circuitry configured to define, in said memory, a first pseudorandom number α, a second pseudorandom number β, a third pseudorandom number γ, a fourth pseudorandom number β', and a fifth pseudorandom number γ';

computer circuitry configured to disguise said image I and said image object P by computing a set of disguised arguments comprising the following matrices:

$G = \alpha I + S1,$ $H = \alpha P + S2,$ $J = \beta I - \gamma S1,$ $K = \beta P - \gamma S2,$ $L = \beta' I - \gamma' S1,$ and $M = \beta' P - \gamma' S2;$ computer circuitry configured to output said set of disguised arguments; to a second computer for computation of a first score matrix, a second score matrix, and a third score matrix, said first score matrix being computed using said matrices G and H, said second score matrix being computed using said matrices J and K, and said third score matrix being computed using said matrices L and M;

computer circuitry configured to receive said first score matrix, said second score matrix, and said third score matrix; and computer circuitry configured to derive a final score matrix using said first score matrix, said second score matrix, and said third score matrix, said final score matrix comprising an approximation of whether said image object P appears in said image I.

73. A first computer for use in preparing a set of numbers to be outsourced from the first computer to a second computer where the set of numbers will be sorted into a sequence by the second computer, and wherein the set of numbers is disguised prior to delivery of the set of numbers to the second computer thereby hindering discovery of the set of numbers by the second computer and unauthorized parties, the first computer comprising:

a memory, said memory comprising a set of n numbers E, wherein n is a positive integer;

computer circuitry configured to define a strictly increasing function f( ) in said memory;

computer circuitry configured to define, in said memory, a sorted sequence $\{\Lambda = \lambda_1, \ldots, \lambda_n\}$ of n pseudorandom numbers;

computer circuitry configured to disguise said set of numbers E by computing a set of n numbers E'=f(E) and a sequence n numbers Λ'=f(Λ), wherein f(E) is a set of numbers obtained from E by replacing every element $e_i$ by $f(e_i)$, and f(Λ) is a sequence of numbers obtained from Λ by replacing every element $\lambda_i$ by $f(\lambda_i)$;

computer circuitry configured to compute a set of numbers W by concatenating said plurality of numbers E' and said sequence Λ';

computer circuitry configured to randomly permute set W;

computer circuitry configured to output said randomly permuted set W for sorting by a second computer;

computer circuitry configured to receive sorted set W' from said second computer, said sorted set W' being derived by sorting said randomly permuted set W; and computer circuitry configured to derive sorted sequence $E'' = \{e_1, \ldots, e_n\}$ from said sorted set W'.

74. A first computer for use in text string analysis wherein it is desired to determine whether a text pattern appears in a larger text string, and wherein the text pattern and the text string are disguised prior to delivery of the text pattern and the text string to a second computer for a text string pattern matching computation, thereby hindering discovery of the text pattern and the text string by the second computer and unauthorized parties, the first computer comprising:

a memory, said memory comprising a test string T is a text string of length N, wherein N is a positive integer, said text string T comprising N text symbols;

a text pattern P in said memory, said text pattern P being of length n, wherein n is a positive integer that is smaller than N, said text pattern P comprising n text symbols;

an alphabet A in said memory, said alphabet A comprising the plurality of possible text symbols that could appear in text string T or text pattern P;

computer circuitry configured to iteratively select one text symbol from said alphabet A until all text symbols from said alphabet A have been selected one time;

computer circuitry configured to, for each selected text symbol in said alphabet A:

(i) generate, in said memory, a disguised text string $T_x$ by replacing each instance of said selected text symbol in said text string T with the number 1, and replacing each other text symbol in text string T with the number 0;

(ii) generate, in said memory, disguised text pattern $P_x$ by replacing each instance of said selected text symbol in said text pattern P with the number 1, and replacing each other text symbol in said text pattern P with the number 0;

(iii) augment said text pattern $P_x$ into a text string P' of length N by adding zeros thereto;

(iv) output said text string P' and said text string $T_x$ to a second computer; and (v) receive a value $D_x$ computed using said text string P' and said text string $T_x$; and computer circuitry configured to compute a score matrix using said values $D_x$ for all said text symbols in said alphabet A.

* * * * *